US011183772B2

(12) United States Patent
Lee et al.

(10) Patent No.: US 11,183,772 B2
(45) Date of Patent: Nov. 23, 2021

(54) EMBEDDED DOWNLIGHT AND RADAR SYSTEM

(71) Applicant: Infineon Technologies AG, Neubiberg (DE)

(72) Inventors: Ho Chun Lee, Yuen Long (HK); Chung Hong Wong, Ma On Shan (HK)

(73) Assignee: Infineon Technologies AG, Neubiberg (DE)

( * ) Notice: Subject to any disclaimer, the term of this patent is extended or adjusted under 35 U.S.C. 154(b) by 372 days.

(21) Appl. No.: 16/130,507

(22) Filed: Sep. 13, 2018

(65) Prior Publication Data
US 2020/0091617 A1   Mar. 19, 2020

(51) Int. Cl.
| | | |
|---|---|---|
| *H01Q 21/06* | (2006.01) | |
| *G01S 13/32* | (2006.01) | |
| *G01S 13/524* | (2006.01) | |
| *G01S 13/87* | (2006.01) | |
| *G01S 13/931* | (2020.01) | |
| *H01Q 25/00* | (2006.01) | |

(52) U.S. Cl.
CPC ......... *H01Q 21/065* (2013.01); *G01S 13/325* (2013.01); *G01S 13/524* (2013.01); *G01S 13/87* (2013.01); *G01S 13/931* (2013.01); *H01Q 25/008* (2013.01)

(58) Field of Classification Search
CPC ...... G01S 13/325; G01S 13/524; G01S 13/87; G01S 13/931
USPC .......................................... 342/114, 109, 117
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| 6,304,178 B1 | 10/2001 | Hayashida | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

Infineon, Product Brief, BGT24LTR11, "Ultra-low power sensing using new generation of 24GHz radar", Aug. 2018, 2 pages.

(Continued)

*Primary Examiner* — Bo Fan
(74) *Attorney, Agent, or Firm* — Slater Matsil, LLP

(57) ABSTRACT

In an embodiment, a downlight includes: a plurality of light emitting diodes (LEDs) disposed in a housing of the downlight, and a millimeter-wave radar. The millimeter-wave radar includes: an antenna disposed in the housing, a controller configured to: detect a presence of a human in a field-of-view of the millimeter-wave radar, determine a direction of movement of the detected human, and produce log data based on the direction of movement of the detected human, and a wireless module configured to transmit the log data to a wireless server.

26 Claims, 14 Drawing Sheets

(56) References Cited

U.S. PATENT DOCUMENTS

| | | | |
|---|---|---|---|
| 7,474,258 B1 | 1/2009 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,089,394 B2 * | 1/2012 | Stewart | G01S 7/034 |
| | | | 342/104 |
| 8,223,067 B2 * | 7/2012 | Moulton | G01S 7/032 |
| | | | 342/159 |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,714,797 B2 | 7/2017 | Groot et al. | |
| 9,886,095 B2 | 2/2018 | Pothier | |
| 9,935,065 B1 | 4/2018 | Baheti et al. | |
| 2002/0030623 A1 | 3/2002 | Arikan et al. | |
| 2003/0164790 A1 | 9/2003 | Kurita et al. | |
| 2003/0179127 A1 | 9/2003 | Wienand | |
| 2004/0178942 A1 | 9/2004 | McLemore | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0238762 A1 | 10/2008 | Gumas | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0068876 A1 | 3/2012 | Bangera et al. | |
| 2012/0087230 A1 | 4/2012 | Guo et al. | |
| 2012/0092284 A1 | 4/2012 | Rofougaran et al. | |
| 2012/0105267 A1 | 5/2012 | DeLia et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2013/0113647 A1 | 5/2013 | Sentelle et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0316261 A1 | 10/2014 | Lux et al. | |
| 2014/0324888 A1 | 10/2014 | Xie et al. | |
| 2015/0035440 A1 * | 2/2015 | Spero | H05B 47/11 |
| | | | 315/153 |
| 2015/0061926 A1 | 3/2015 | Ranney et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0195856 A1 * | 7/2016 | Spero | G06N 5/046 |
| | | | 700/90 |
| 2016/0200276 A1 | 7/2016 | Diewald | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar Y.B. et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0139043 A1 | 5/2017 | Takada | |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1 | 12/2017 | Malysa et al. | |
| 2018/0011182 A1 | 1/2018 | Sud | |
| 2018/0046255 A1 | 2/2018 | Rothera et al. | |
| 2018/0071473 A1 | 3/2018 | Trotta et al. | |
| 2018/0074173 A1 | 3/2018 | Trotta et al. | |
| 2018/0101239 A1 | 4/2018 | Yin et al. | |
| 2018/0106897 A1 | 4/2018 | Shouldice et al. | |
| 2018/0120420 A1 | 5/2018 | McMahon et al. | |
| 2018/0192919 A1 | 7/2018 | Nakayama et al. | |
| 2019/0196004 A1 | 6/2019 | Zhao et al. | |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| EP | 1732247 A1 | 12/2006 |
| GB | 2247799 A | 3/1992 |
| JP | 2001174539 A | 6/2001 |

(56) References Cited

FOREIGN PATENT DOCUMENTS

| | | | |
|---|---|---|---|
| JP | 2004198312 | A | 7/2004 |
| JP | 2006234513 | A | 9/2006 |
| JP | 2008029025 | A | 2/2008 |
| JP | 2008089614 | A | 4/2008 |
| JP | 2009069124 | A | 4/2009 |
| JP | 2011529181 | A | 12/2011 |
| JP | 2012112861 | A | 6/2012 |
| JP | 2013521508 | A | 6/2013 |
| JP | 2014055957 | A | 3/2014 |
| KR | 20090063166 | A | 6/2009 |
| KR | 20140082815 | A | 7/2014 |
| WO | 2007060069 | A1 | 5/2007 |
| WO | 2009129232 | A1 | 10/2009 |
| WO | 2013009473 | A2 | 1/2013 |
| WO | 2016033361 | A1 | 3/2016 |
| WO | 2017151682 | A1 | 9/2017 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Cree Smartcast Technology, "Wireless LED Lighting Controls", Oct. 16, 2014, 12 pages.

Current, Powered by GE, "Wireless Integrated Thread Sensor" WIT100, Apr. 26, 2018, 2 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Solutions, "Electronic Article Surveillance Plus", http://www.nefits.com/html/EAS%20plus.html, Aug. 2018, 2 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Ge Daintree, "Wired & Wireless Controls" Managing your environment, current, powered by GE, Aug. 3, 2018, 8 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chui et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Wikipedia, "A low-power wide-area network (LPWAN) or low-power wide-area (LPWA) network or low-power network (LPN)", https://en.wikipedia.org/wiki/LPWAN, Jul. 22, 2018, 3 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Chen, J. et al., Solution Brief, Current powered by GE, "Turn Existing Street Lights Into Actionable Data Sources and Revenue Streams", Jul. 2015, 4 pages.

Stimmel, C. L. et al., GIGAOM Research, "Smart Building Automation and the Enterprise Internet of Things", Feb. 2015, 16 pages.

Suleymanov, Suleyman, "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Infineon, XDPL8105—Digital Flyback Controller IC:, digital power, Sep. 28, 2016, 33 pages.

Infineon, XDP LED—XDPL8105, "Digital flyback controller IC for LED drivers", Nov. 2016, 2 pages.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Nanzer, Jeffrey A., "Millimeter-Wave Interferometric Angular Velocity Detection", IEEE Transactions on Microwave Theory and Techniques, vol. 58, No. 12, Dec. 2010, 9 pages.

Santra, Avik et al., "Short-Range Millimetric-Wave Radar System for Occupancy Sensing Application", Sensor Applications, vol. 1, No. 3, Jul. 2017, 4 pages.

Infineon, "Using BGT24MTR11 in Low Power Applications", BGT24MTR11, 24 Ghz Radar, RF and Protection Devices, Application Note AN341, Revision: Rev. 1.0, Dec. 2, 2013, 25 pages.

(56) References Cited

OTHER PUBLICATIONS

Tanis, S., "Automotive Radar Sensors and Congested Radio Spectrum: An Urban Electronic Battlefield?", Analog Devices, Analog Dialogue, Jul. 2018, 5 pages.
TEXAS Instruments, "XWR1xxx Power Management Optimizations—Low Cost LC Filter Solution", Application Report SWRA577—Oct. 2017, 19 pages.
Texas Instruments, "Programming Chirp Parameters in TI Radar Devices", Application Report SWRA553—May 2017, 15 pages.
Damashek, Jonathan "Elevator Installers and Repairers are Among Construction Occupations with Highest Injury Rate", HKD Hecht, Kleeger& Damashek, Legal Blog, Mar. 24, 2015, 7 pages.

\* cited by examiner

Prior Art top view bottom view cross-section view top view cross-sectional view perspective view (bottom)

perspective view (bottom)

EMBEDDED DOWNLIGHT AND RADAR SYSTEM

CROSS-REFERENCE TO RELATED APPLICATIONS

This application is related to co-pending U.S. patent application Ser. No. 15/950,615, filed Apr. 11, 2018, which is hereby incorporated herein by reference.

TECHNICAL FIELD

The present invention relates generally to an electronic system and method, and, in particular embodiments, to an embedded light and radar system.

BACKGROUND

Light bulbs are ubiquitous in modern society. Efficient light bulbs are often desirable. Light emitting diode (LED) light bulbs are light bulbs that use LEDs to produce lights. LED light bulbs are more efficient than conventional incandescent lights, which produce light with a glowing filament heated by an electric current. LED light bulbs are also more efficient than fluorescent lamps. In addition to being more efficient, (or as a result of being more efficient), LED light bulbs produce less heat than conventional light bulbs.

LED light bulbs use LED drivers for driving the LEDs. LED drivers and associated circuitry of a light fixture typically convert AC power (e.g., 60 Hz 120 V), e.g., from the grid, into DC power and deliver DC voltage or a PWM signal to LEDs for generating light. Although some LED light bulbs cannot be dimmed, some LED light bulbs are dimmable by modulating the PWM signal to adjust the light intensity produced by the LEDs.

Some LED light bulbs and light fixtures include LED drivers inside the light fixture. Other LED light bulbs and light fixtures include LED drivers outside the light fixture.

A variety of light fixtures exists. For example, a downlight is a light fixture that is typically installed in a hollow opening in a ceiling, and concentrates the generated light in a downward direction. Some downlights use LED light bulbs to produce light. For example, FIG. 1 shows conventional downlight 100 using LEDs to produce light. Downlights are popular in shopping malls, offices, industrial settings, airports and other settings.

SUMMARY

In accordance with an embodiment, a downlight includes: a plurality of light emitting diodes (LEDs) disposed in a housing of the downlight, and a millimeter-wave radar. The millimeter-wave radar includes: an antenna disposed in the housing, a controller configured to: detect a presence of a human in a field-of-view of the millimeter-wave radar, determine a direction of movement of the detected human, and produce log data based on the direction of movement of the detected human, and a wireless module configured to transmit the log data to a wireless server.

In accordance with an embodiment, a method including: detecting a presence of a human in a field-of-view of a millimeter-wave radar embedded in a housing of a downlight, determining a direction of movement of the detected human, producing log data based on the direction of movement of the detected human, and transmitting the log data to a server using a wireless transmission channel.

In accordance with an embodiment, a method includes: determining whether humans are entering or exiting a building using millimeter-wave radars embedded in respective housings of respective downlights of a plurality of downlights located at entrances of the building, calculating a first number of humans entering the building during a first period of time, calculating a second number of humans exiting the building during the first period of time, and controlling a brightness of light produced by the plurality of downlights based on the first and second number of humans.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
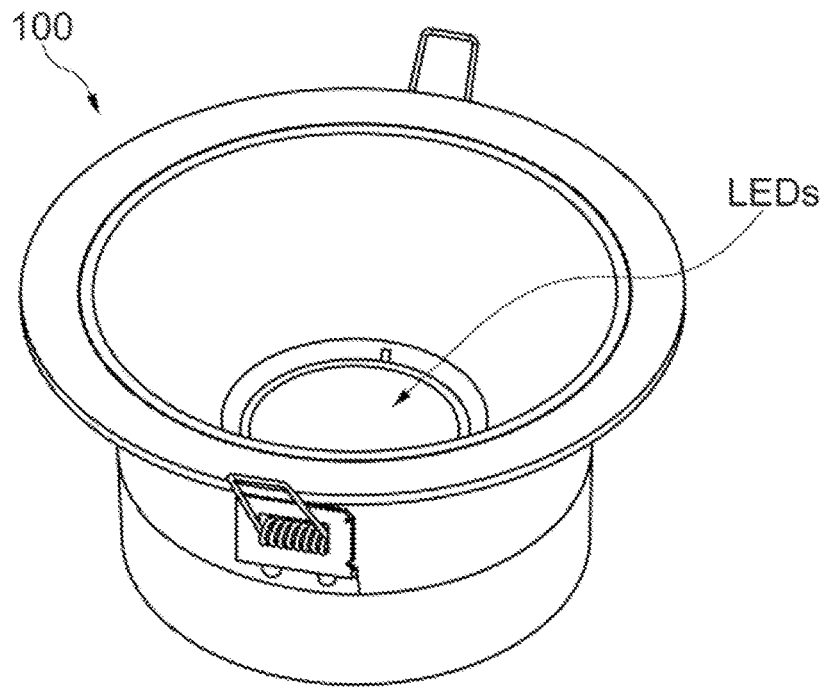
FIG. 1 shows a conventional downlight using LEDs to produce light.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

The present invention will be described with respect to embodiments in a specific context, a LED downlight having a millimeter-wave radar and implemented in a building (such as a shopping mall). Some embodiments may be used in other types of downlights, (such as a non-LED based downlight) as well as in street lights and in other types of lamps.

In an embodiment of the present invention, a LED downlight counts a number of humans entering and exiting an entrance of a building by using a millimeter-wave radar embedded in the LED downlight. Direction of humans (e.g., entering or exiting the entrance) is determined by using ranging information, such as by using range FFT. Data (e.g., human detection log or raw data) is transmitted from one or more LED downlights to a wireless server using a low-power wide-area network (LPWAN) protocol. The wireless server makes available the data to various electronic devices (e.g., via the Internet). The wireless server also controls the LED downlights based on information received from the LED downlights.

In some embodiments, the wireless server also interacts with additional sensors (e.g., temperature sensors, pressure sensors, etc.) and additional systems (e.g., air conditioner, security system, etc.) of the building. For example, in some embodiments, the wireless server receives data from such sensors and from the LED downlights and controls such systems (e.g., air conditioner, security system, etc.) based on data received from the sensors and from the LED downlights. In some embodiments, the wireless server receives data from such sensors and from the LED downlights and controls the LED downlights based on data received from the sensors and from the LED downlights.

Some embodiments perform data mining and data processing (e.g., using artificial intelligence and machine learning algorithms) of data gathered by the LED downlights, and by the additional sensors to predict behavior (e.g., number of humans inside a building) and adjusts the LED downlights and other systems based such predictions.

Figure 2:
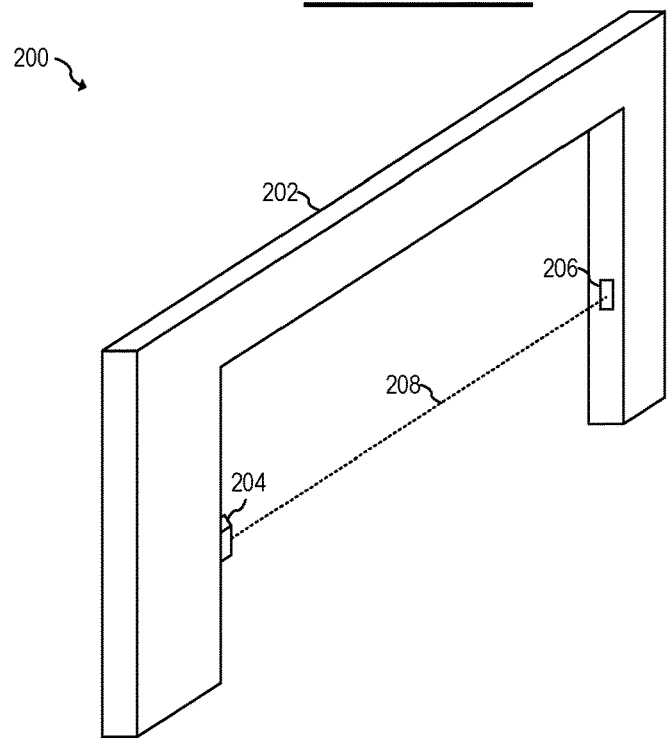
FIG. 2 shows a conventional indoor infrared system for detecting humans at an entrance.

Monitoring people traffic is often desirable in many applications, from stores and malls to factories and airports. For example, FIG. 2 shows conventional indoor infrared system 200 for detecting humans at entrance 202. In particular infrared system 200 includes infrared transmitter (TX) 204 and infrared receiver (RX) 206.

During normal operation, infrared TX 204 transmits infrared signal 208 towards infrared RX 106. When a human crosses entrance 202 (e.g., of a store or shopping mall), the human blocks infrared signal 208, thereby causing infrared RX 206 to stop receiving infrared signal 208. Infrared system 200 interprets the interruption of infrared signal 208 as a human entering or exiting entrance 202. Such event may trigger an action, such as ringing a bell.

Although system 200 detects humans as they cross entrance 202, system 200 does not detect the direction in which the human is traveling (e.g., entering or exiting the store or shopping mall entrance). Detecting the direction in which a human is traveling is often desirable. For example, a landlord of a shopping mall may determine the number of people inside the mall by counting the number of people entering the mall and subtracting the number of people exiting the mall. Such information may be useful for a variety of purposes, including safety purposes, improving the mall experience, and creating marketing materials.

A conventional camera-based system may be used to perform people counting. For example, a camera-based system may use video cameras to capture images of humans entering the shopping mall. Each video-camera may send such images to a centralized location (e.g., a server) using WiFi. The server may then use facial recognition algorithms to count the number of people entering the shopping mall.

Figure 3:
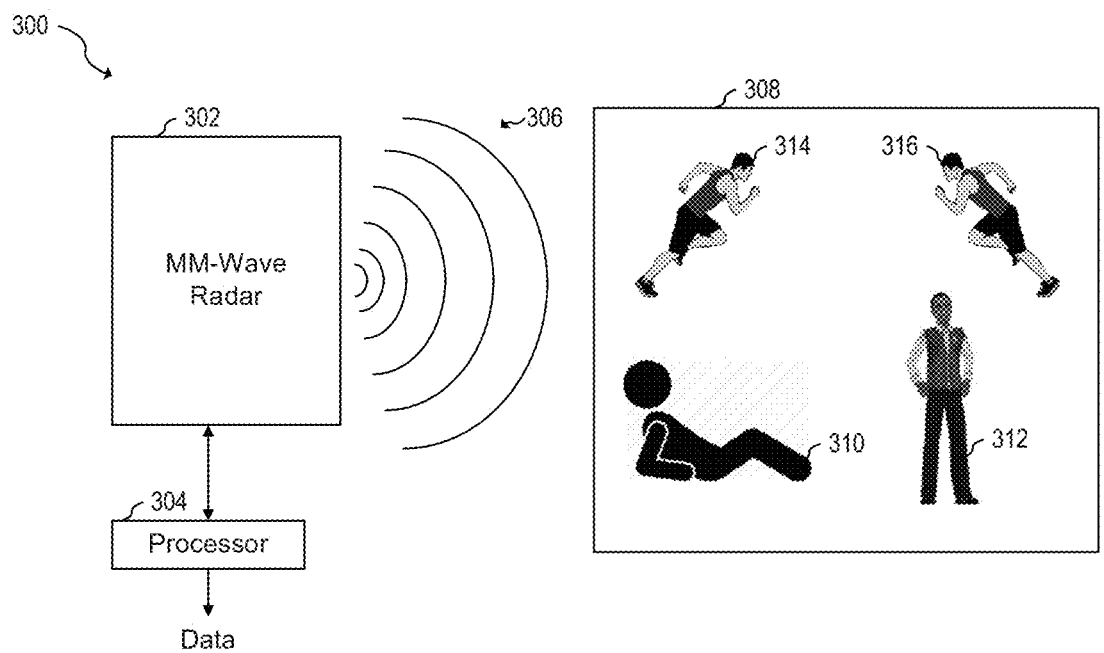
FIG. 3 shows a radar system, according to an embodiment of the present invention.

Embodiments of the present invention detect humans (e.g., moving, standing, lying down, etc.) and humans' moving direction (e.g., entering or exiting a building) by using a millimeter-wave radar together with signal processing techniques, such as Doppler processing, frequency modulated continuous wave (FMCW) processing, or frequency shift keying (FSK). For example, FIG. 3 shows radar system 300, according to an embodiment of the present invention. Radar system 300 includes millimeter-wave radar 302 and processor 304.

During normal operation, millimeter-wave radar 302 transmits a plurality of radiation pulses 306, such as chirps, to scene 308. The transmitted radiation pulses 306 are reflected in objects of scene 308. The reflected radiation pulses (not shown in FIG. 3), which are also referred to as the echo signal, are detected by millimeter-wave radar 302 and processed by processor 304 to, for example, detect humans and humans' moving direction.

The objects in scene 308 may include static humans, such as lying human 310, humans exhibiting low and infrequent motions, such as standing human 312, and moving humans, such as running or walking human 314 and 316. The objects in scene 308 may also include static objects, such as furniture and periodic movement equipment (not shown). Other objects may also be present in scene 308.

Processor 304 analyses the echo data to detect humans and humans' moving direction using signal processing techniques.

Processor 304 may be implemented as a general purpose processor, controller or digital signal processor (DSP). In some embodiments, processor 304 may be implemented as a custom application specific integrated circuit (ASIC). In some embodiments, processor 304 includes a plurality of processors, each having one or more processing cores. In other embodiments, processor 304 includes a single processor having one or more processing cores.

Millimeter-wave radar 302 includes a millimeter-wave radar sensor circuit and an antenna(s). The millimeter-wave radar transmits and receives signals in the 20 GHz to 122 GHz range. Alternatively, frequencies outside of this range may also be used. Millimeter-wave radar 302 may be implemented, for example, in monostatic or bistatic configurations.

Figure 4:
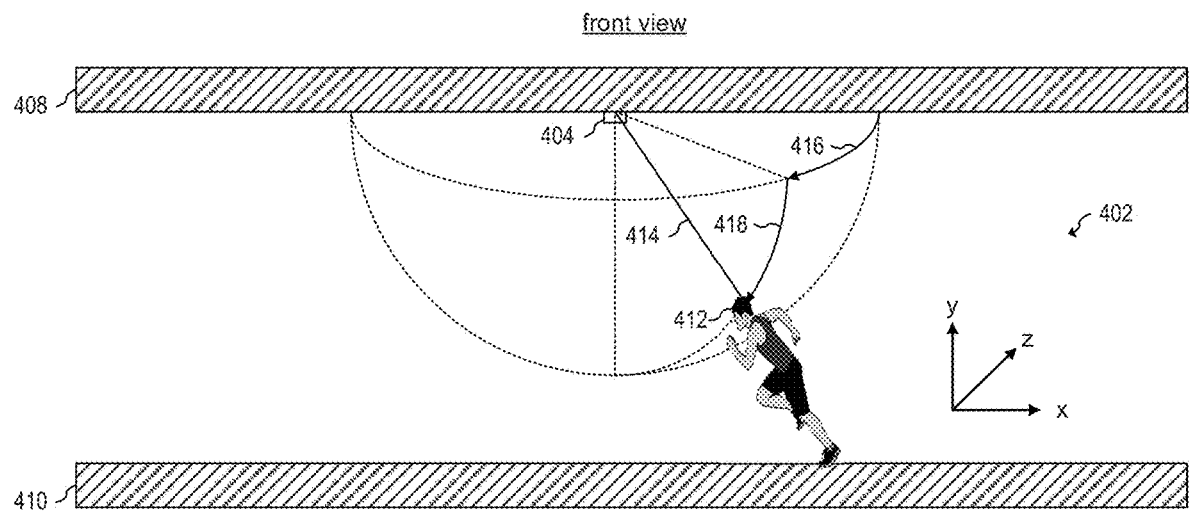
FIG. 4 shows a bistatic millimeter-wave radar, according to an embodiment of the present invention.

Implementing millimeter-wave radar 302 in, e.g., bistatic configuration, has the advantage of enabling radar system 300 to detect and track the location of a human as the human moves across the field-of-view of millimeter-wave radar 302. For example, FIG. 4 shows bistatic millimeter-wave radar 404, according to an embodiment of the present invention. As shown in FIG. 4, bistatic millimeter-wave radar 404 is located in ceiling 408. Human 412 is located in scene 402 above floor 410 and within the field-of-view of bistatic millimeter-wave radar 404. Bistatic millimeter-wave radar 404 may report and track location information of human 412 by using elevation component 418, azimuth component 416, and range component 415. Bistatic millimeter-wave radar 404, therefore, is advantageously capable of determining the direction in which human 412 is moving, whether human 412 is entering or exiting an entrance (e.g., if bistatic millimeter-wave radar 404 is located at an entrance), and counting how many humans have entered and/or exited the entrance. Bistatic millimeter-wave radar 404 is also advantageously capable of determining the speed of movement of humans, whether a human is lying down, or standing still, and other parameters associated with the physical characteristics and movements of humans.

Figure 5A:
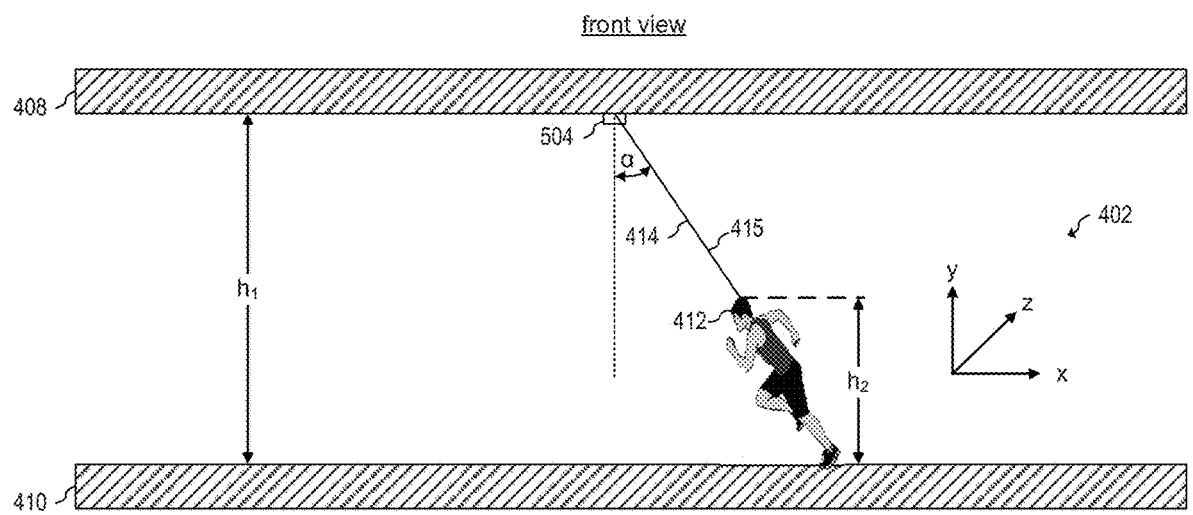
FIG. 5A shows a monostatic millimeter-wave radar, according to an embodiment of the present invention.

Implementing millimeter-wave radar 302 in, e.g., monostatic configuration, has the advantage of enabling radar system 300 to detect a human as the human moves across the field-of-view of millimeter-wave radar 302 and to determine whether the human is entering or exiting an entrance (e.g., if the radar is located at an entrance) by using range information. For example, FIG. 5A shows monostatic millimeter-wave radar 504, according to an embodiment of the present invention. As shown in FIG. 5A, monostatic millimeter-wave radar 504 is located in ceiling 408. Human 412 is located in scene 402 above floor 410 and within the field-of-view of monostatic millimeter-wave radar 504.

Monostatic millimeter-wave radar 504 detects human 412 by using range component 415. For example, if angle α is 0° (where α is an angle between centerline 414 of the field-of-view of monostatic millimeter-wave radar 504 and a vertical axis y), range component 415 is equal to height $h_1$ when no object is between monostatic millimeter-wave radar 504 and floor 410, and is equal to height $h_2$ (the height of human 412) when human 412 crosses the field-of-view of monostatic millimeter-wave radar 504. Therefore, by detecting the change in height (from $h_1$ to $h_1-h_2$ and back to $h_1$), it is possible to detect that human 412 crossed the field-of-view of monostatic millimeter-wave radar.

If angle α is greater than 0° (e.g., between 5° and 15°, such as 10°), it is possible to determine the direction in which human 412 is moving. For example, when no object is between monostatic millimeter-wave radar 504 and floor 410, range component 415 is equal to $h_1*\cos(\alpha)$. When human 412 is moving in the x direction from right to left (as illustrated in FIG. 5A), range component 415 may decrease abruptly when human 412 initially enters the field-of-view of monostatic millimeter-wave radar 504, and then gradually decreases as human 412 moves from right to left. Range component 415 returns to $h_1*\cos(\alpha)$ when human 412 is no longer in the field-of-view of monostatic millimeter-wave radar 504. In some embodiments, movement in the x direction from right to left may correspond to human 412 entering the building. Some embodiments may use the phase angle between the transmitted and received radar signals to determine the range component.

When human 412 is moving in the x direction from left to right, range component 415, initially at $h_1*\cos(\alpha)$, may decrease abruptly when human 412 initially enters the field-of-view of monostatic millimeter-wave radar 504, and then gradually increases as human 412 moves from left to right. Range component 415 returns to $h_1*\cos(\alpha)$ when human 412 is no longer in the field-of-view of monostatic millimeter-wave radar 504.

Figure 5B:
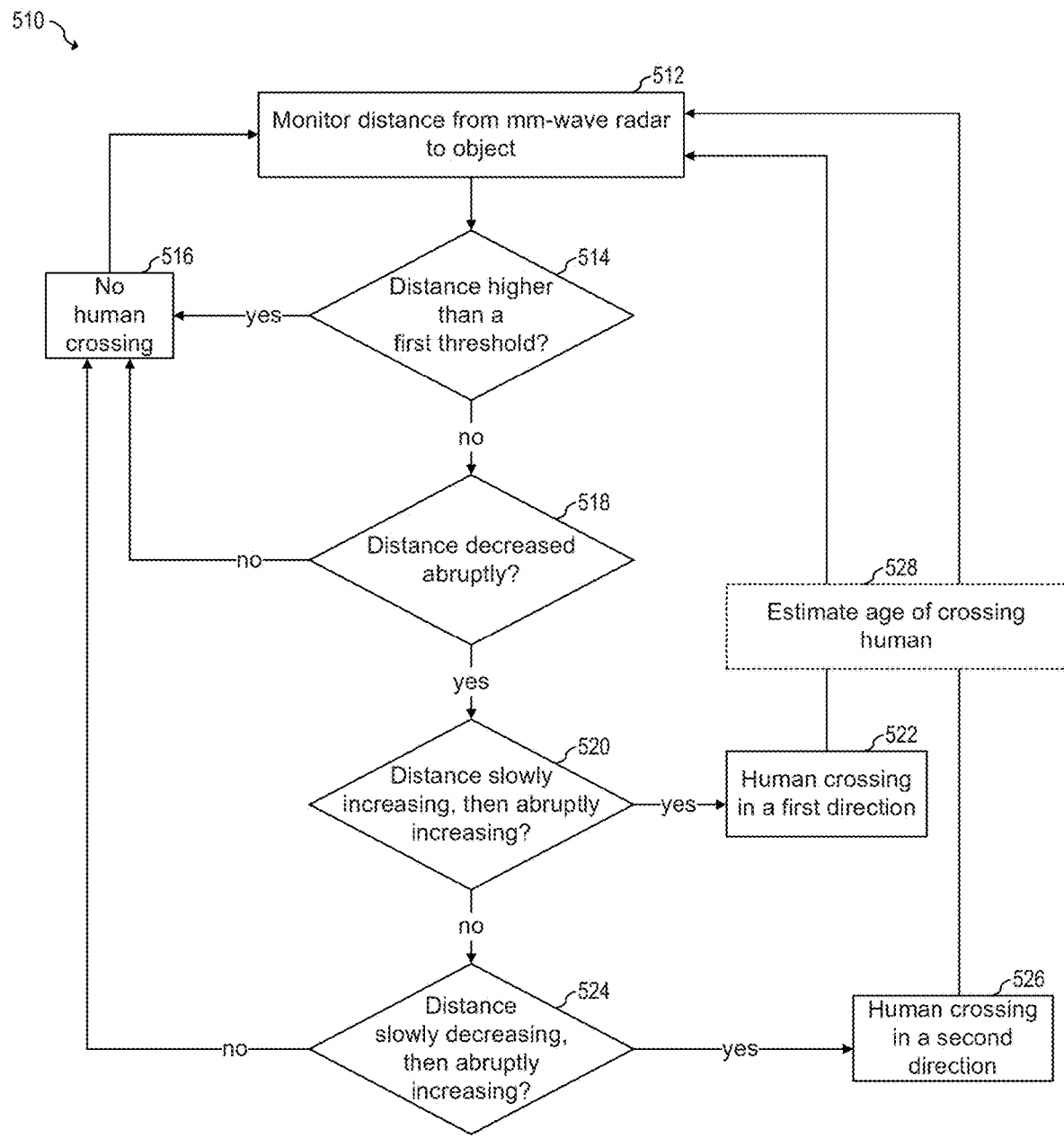
FIG. 5B shows a flow chart of an embodiment method for detecting humans crossing a plane, according to an embodiment of the present invention.

FIG. 5B shows a flow chart of embodiment method 510 for detecting humans crossing a plane, according to an embodiment of the present invention. The explanation that follows assumes that method 510 is implemented by monostatic millimeter-wave radar 504. However, other millimeter-wave radars, such as millimeter-wave radar 404, may implement method 510.

During step 512, the millimeter-wave radar monitors the distance towards objects in its field-of-view. If no object is crossing the field-of-view (where the field-of-view defines a plane dividing two sides, such as left and right in FIG. 5A), the distance between the millimeter-wave radar and the closest object is equal to the distance to the floor. If it is determined during step 514 that the distance between the millimeter-wave radar to the closest object is similar to the distance to the floor (e.g., higher than a first threshold, such as 90% of the distance to the floor), then, it is determined during step 516 that no human is crossing the plane and the millimeter-wave radar continues monitoring the distance during step 512.

If it is determined during step 514 that the distance between the millimeter-wave radar and the closest object is lower than the distance to the floor (e.g., lower than the first threshold), then, the abruptness of the change in distance between the millimeter-wave radar and the object is determined during step 518. If the change in distance between the millimeter-wave radar and the closest object is determined to be abrupt during step 518, then if the distance between the millimeter-wave radar and the closest object is determined during step 520 to slowly increase and then abruptly return to the distance to the floor, then it is determined that a human crossed the plane in a first direction (e.g., from left to right in FIG. 5A) during step 522. If not, if the distance between the millimeter-wave radar and the closest object is determined during step 524 to slowly decrease and then abruptly return to the distance to the floor, then it is determined that a human crossed the plane in a second direction (e.g., from right to left in FIG. 5A) during step 524. If not, then the millimeter-wave radar determines that no human is crossing during step 516.

An abrupt change in distance includes, for example, a change of the distance between the millimeter-wave radar and the detected object from the distance between the millimeter-wave radar to the floor and a distance between the millimeter-wave radar to the floor minus, e.g., 70% of a typical height of a human. A typical height of a human that is walking may range, for example, between 4.5 feet and 6.5 feet. In some embodiments, the age of the human crossing may be estimated based on the change in distance from the millimeter-wave radar to the detected objects during step 528 since the change in distance is related to the height of the detected human, and the height of the detected human is correlated with age.

In some embodiments, movement in the x direction from right to left may correspond to human 412 entering the entrance and movement in the x direction from left to right corresponds to human 412 exiting the entrance. In other embodiments, movement in the x direction from right to left may correspond to human 412 exiting the entrance and movement in the x direction from left to right corresponds to human 412 entering the entrance. It is understood that the movement of human 412 may include a z component (i.e., movement in the z-axis) without affecting the operation of monostatic millimeter-wave radar 504. For example, centerline 414 may define a plane dividing a left portion from a right portion of scene 402 (with respect to the x direction). Monostatic millimeter-wave radar 504 may detect human 412 crossing from right to left or left to right while tolerating non-zero movements of human 412 in the y axis or z axis. Some embodiments, may use a millimeter-wave radar having, e.g., one transmitter antenna and two receiver antennas to improve resolution of the human movement direction.

Monostatic millimeter-wave radar 504, therefore, is advantageously capable of determining the direction in which human 412 is moving, whether human 412 is entering (incoming) or exiting (outgoing) a location such as an entrance (e.g., if monostatic millimeter-wave radar 504 is located at an entrance), and counting how many humans have entered and/or exited the location (e.g., entrance) based (e.g., solely) on range information. By determining direction of movement based on range information (e.g., using range FFT), it is possible to determining how many humans have entered or exited an entrance without performing complex computations (e.g., determining the three-dimensional location of a human in a field-of-view or performing facial recognition image processing).

Figure 5C:
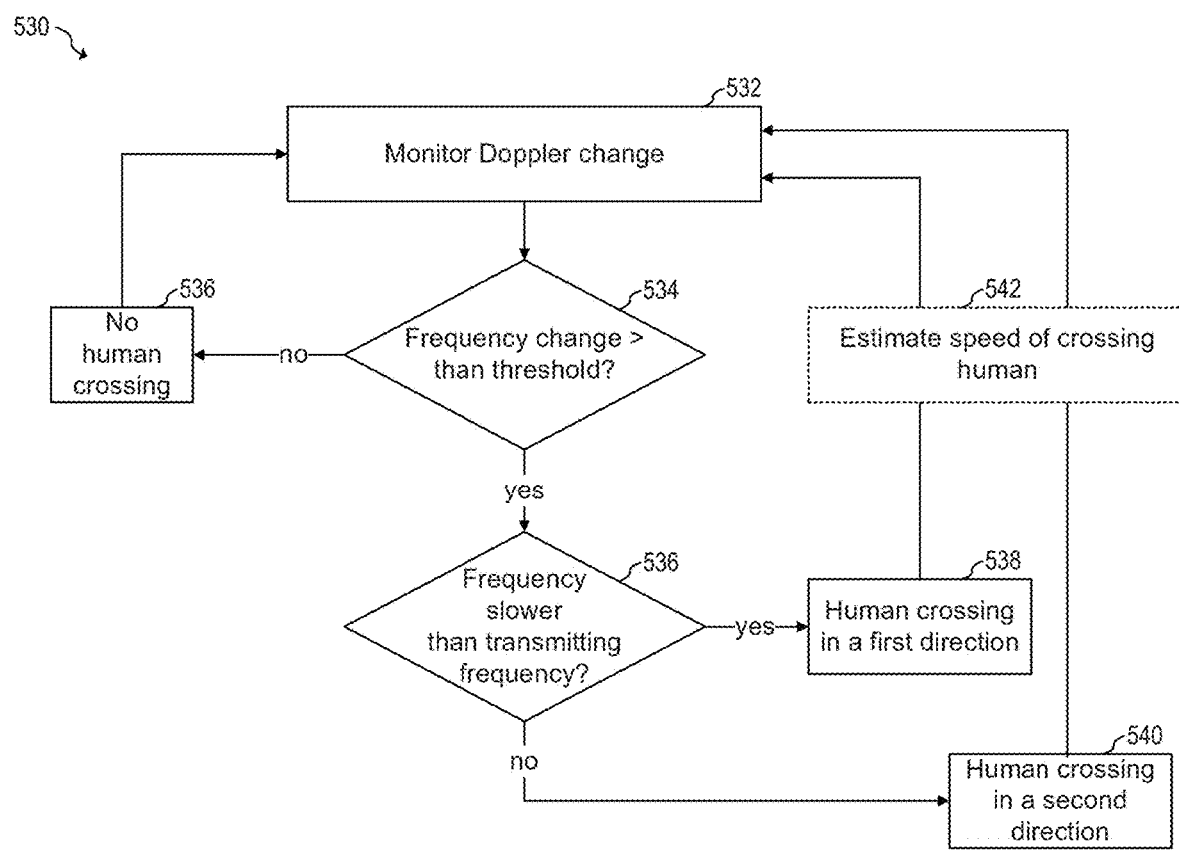
FIG. 5C shows a flow chart of an embodiment method for detecting humans crossing a plane, according to an embodiment of the present invention.

FIG. 5C shows a flow chart of embodiment method 530 for detecting humans crossing a plane, according to an embodiment of the present invention. The explanation that follows assumes that method 530 is implemented by monostatic millimeter-wave radar 504. However, other millimeter-wave radars, such as millimeter-wave radar 404, may implement method 510.

During step 532, the millimeter-wave radar transmit radar signals (e.g., chirps) towards its field-of-view, receives the echo signals and determines the change in frequency between the sent and received radar signals using Doppler signal processing. The change in frequency between sent and received radar signals is determined during step 534. In some embodiments, the change in frequency is determined during step 534 by measuring the phase difference between the I signal and the Q signal coming out of a mixer circuit that receives the echo signal.

If the change in frequency is lower than a predetermined threshold (e.g., no frequency change between sent and received radar signals), then, it is determined that no human is crossing the plane during step 536 and millimeter-wave radar continues monitoring the Doppler change in step 532.

If the change in frequency is higher than the predetermined threshold, then, if it is determined during step 536 that the frequency of the echo signal is lower than the transmitted radar signals, then, it is determined that a human crossed the plane in a first direction (e.g., from left to right in FIG. 5A) during step 538. If it is determined during step 536 that the frequency of the echo signal is higher than the transmitted radar signals, then, it is determined that a human crossed the plane in a second direction (e.g., from right to left in FIG. 5A) during step 540.

In some embodiments, the speed of the human crossing the plane may be determined during step 542 based on the magnitude of change in frequency, which is determined, for example, in step 534.

In some embodiments, method 530 may advantageously be implemented using a processing complexity that is low enough to be implemented locally inside millimeter-wave radar 504.

Some embodiments may combine methods 510 and 530 to, e.g., increase accuracy of human detection or other moving parameters. For example, some embodiments that combine aspects of methods 510 and 530 may adjust the threshold for determined what constitutes and abrupt change (step 518) based on the magnitude of the frequency change (step 534). As another non-limiting example, some embodiments may estimate age of human crossing (step 528) and speed of humans crossing (step 542).

As described for example in FIGS. 5B and 5C, having an angle $\alpha$ greater than 0° advantageously allows for determining whether a human is crossing a plane and the direction of the human crossing with a processing complexity that is lower than the processing complexity used for calculating the 3D location of the human when crossing the field-of-view of the millimeter-wave radar.

Monostatic millimeter-wave radar 504 may transmit the raw data (e.g., range/time information) or processed data (e.g., a log including, e.g., that a human(s) entered/exited at time $t_0$, or, e.g., a number of humans entered and/or exited during a period of time from time $t_0$ to time $t_1$) to a central location. In some embodiments, since the amount of data transmitted by monostatic millimeter-wave radar 504 to the central location is relatively small (e.g., the log data), it is possible to use an LPWAN protocol, such as SigFox, NBIoT or LoRa, to transmit the data from monostatic millimeter-wave radar 504 to the central location.

Monostatic millimeter-wave radar 504 may be calibrated to optimize operation for a particular height $h_1$. For example, some embodiments adjust the transmission power of the transmitter such that it has enough power to detect humans at the installed height while avoiding saturation of the receiver that receives the echo signal. For example, a first test signal may be transmitted towards the field-of-view without humans crossing (e.g., empty floor) to determine optimal strength. For example, the first test signal may have chirps transmitted at different strengths. The echo signal may be analyzed to pick a strength that does not saturate the receiver while still using optimal dynamic range.

In some embodiments, a second test signal (which may be equal to the first test signal) may be used when a test human is crossing the plane to determine the threshold for detection. For example, humans that are farther from the millimeter-wave radar tend to produce a weaker reflected signal. A detection threshold based on the strength of the received signal may be adjusted to allow for identifying humans from the noise.

Calibrating the millimeter-wave radar to be optimized for a particular height advantageously improve signal-to-noise ratio (SNR), which helps reduce the number of false positives and false negative human detection.

In some embodiments, a calibration procedure may be launched remotely (e.g., through LPWAN). In some embodiments, the signal processing associated with selecting optimal parameters may be performed locally. For example, the test signals and calibration steps may be pre-installed in the millimeter-wave radar.

In some embodiments, the change in frequency is determined during step 534 by measuring the phase difference between the I signal and the Q signal coming out of a mixer circuit that receives the echo signal.

In some embodiments, a single monostatic millimeter-wave radar design is advantageously suitable for operation in different areas, e.g., different entrances having ceilings with different heights, entrances of rooms or stores inside a building, locations inside a building (e.g., not entrances), etc.

In some embodiments, monostatic millimeter-wave radar 504 may be calibrated dynamically. In other words, calibration may be triggered by a command transmitted wirelessly during normal operation.

Advantages of some embodiments include extended range of human detection compared to conventional systems. For example, in some embodiments, a millimeter-wave radar installed in a ceiling and having a field-of-view with an angle α of, e.g., between 5° and 15°, such as 10°, is capable of detecting humans and human movements (e.g., direction of movement) with a range of 10 meters or more in the x axis, compared with conventional systems, such as passive infrared systems or ultrasound-based systems, which have a typical coverage range of the x axis under 4 meters.

Figure 6D:
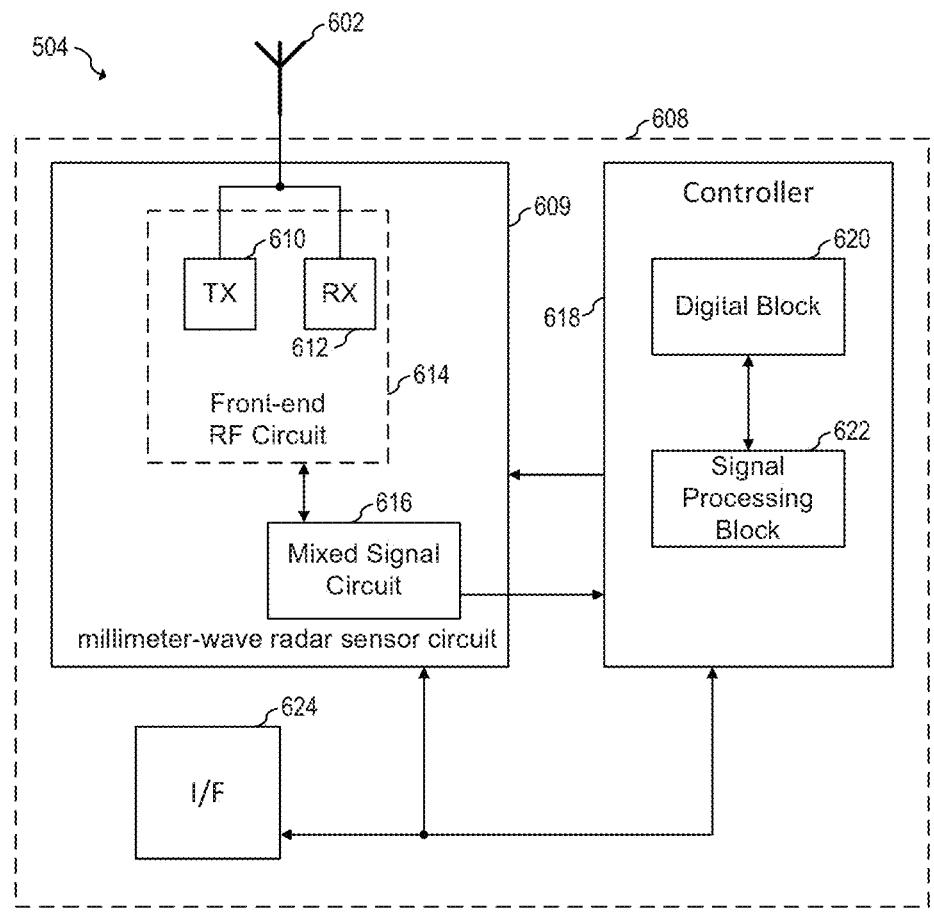
FIG. 6D shows a schematic diagram of the monostatic millimeter-wave radar of FIG. 6A, according to an embodiment of the present invention.
Figure 6B:
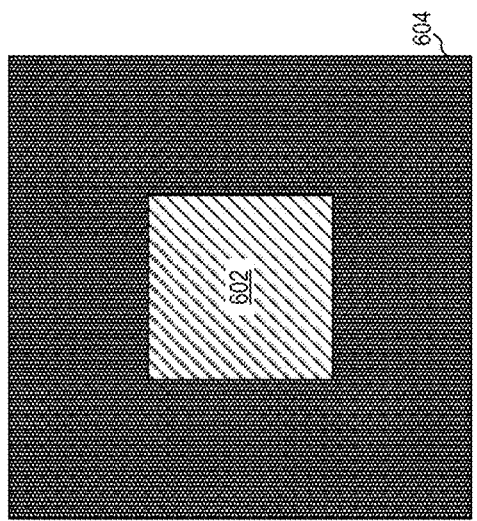
FIGS. 6B and 6C show a top view and a bottom view, respectively, of the monostatic millimeter-wave radar of FIG. 6A, according to an embodiment of the present invention.
Figure 6C:
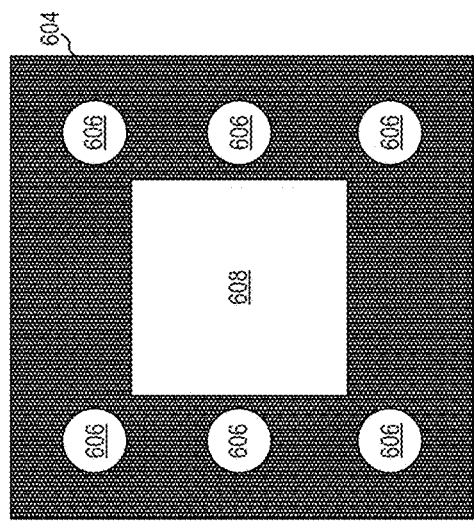
Figure 6A:
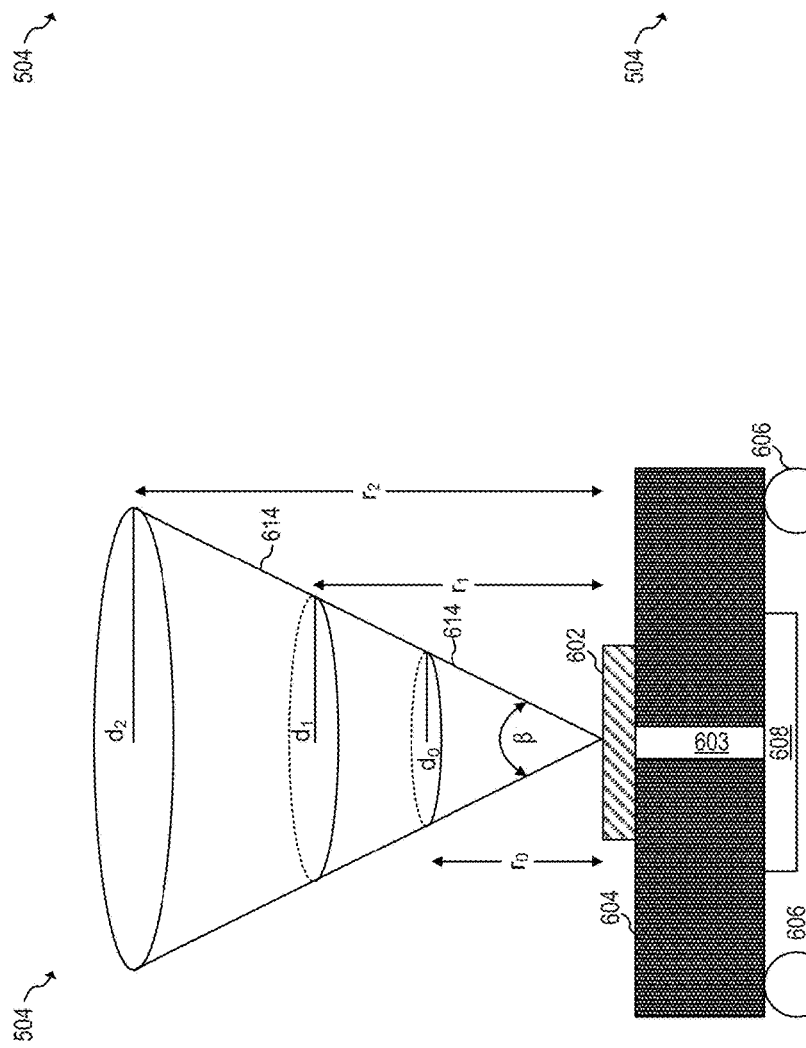
FIG. 6A shows a cross-section view of the monostatic millimeter-wave radar of FIG. 5A, according to an embodiment of the present invention.

FIG. 6A shows a cross-section view of monostatic millimeter-wave radar 504, according to an embodiment of the present invention. Millimeter-wave radar 504 includes die 608, balls 606, high frequency laminate 604 and antenna 602. Millimeter-wave radar 504 may be implemented, for example, as described in U.S. Pat. No. 9,935,065, filed on Dec. 21, 2016, in U.S. Patent Publication No. 2016/0178730, filed on Nov. 30, 2015, and in U.S. Patent Publication No. 2018/0074173, filed on Nov. 30, 2015, the contents of which are incorporated herein by reference in their entirety.

As shown in FIG. 6A, millimeter-wave radar 504 is implemented in monostatic configuration, in which the same antenna 602 is integrated in the same package, and is used for the transmitter (TX) module and for the receiver (RX) module. Implementing millimeter-wave radar 504 in monostatic configuration has the advantage of having a small footprint (e.g., in a device or system).

Antenna 602 is coupled to die 608, for instance, using conductive pillar 603. In some embodiments conductive pillar 603 is part of antenna 602 and is made with the same material as antenna 602. In other embodiments, the antenna may be remotely fed, for instance, through electromagnetic coupling.

High frequency laminate may be, for example, RO 4350 laminate from Rogers Corporation, Megtron 6 or 7 laminates from Panasonic, HL972 or HL 872 laminates from Mitsubishi. Other high-speed laminates may also be used.

Balls 606 are used to connect die 608 with external circuits. Some embodiments may implement pads instead of balls. Other connectors may also be used.

Die 608 includes a millimeter-wave radar sensor circuit (not shown). The millimeter-wave radar sensor circuit may transmit and receive signals in the GHz range via antenna 602. For example, some embodiments may transmit and receive signals such as chirps in a band allocated around frequencies such as 95 GHz, 120 GHz, 140 GHz, and/or 240 GHz and/or other frequencies between about 95 GHz and about 240 GHz range. Other embodiments may transmit and receive signals such as chirps in the 20 GHz to 122 GHz range. Yet other embodiments may transmit and receive signals, such as chirps with frequencies above 240 GHz. Other frequencies and frequency ranges are also possible.

In some embodiments, the millimeter-wave radar sensor circuit process the echo signals received by using band-pass filter (BPFs), low-pass filter (LPFs), mixers, low-noise amplifiers (LNAs), and intermediate frequency (IF) amplifiers in ways known in the art. The echo signals are then digitized using one or more analog-to-digital converters (ADCs) for further processing. Other implementations are also possible.

Millimeter-wave radar 504 is capable of detecting the presence of objects (e.g., humans) in field-of-view 614 (i.e., the beam of millimeter-wave radar 504). As shown in FIG. 6A, the area of object detection varies based on the distance between the object and antenna 602. As shown, the diameter of coverage of field-of-view 614 may increase with height. For example, diameter $d_1$, which corresponds to range (distance) $r_1$ to antenna 602, is smaller than diameter $d_2$, which corresponds to range $r_2$ to antenna 602, where distance $r_2$ is larger than distance $r_1$. The area of coverage is based on angle β, which may be, for example, between 45° and 50°. Angles smaller than 45° or bigger than 50° may also be used.

In some embodiments, millimeter-wave radar 504 determines the distance to the detected objects using range transformations, such as range FFT.

FIGS. 6B and 6C show a top view and a bottom view, respectively, of millimeter-wave radar 504, according to an embodiment of the present invention. FIG. 6D shows a schematic diagram of millimeter-wave radar 504, according to an embodiment of the present invention.

As shown, millimeter-wave radar 504 includes die 608 and antenna 602. Die 608 includes millimeter-wave radar sensor circuit 609, controller 618, and interface circuit 624. Millimeter-wave radar sensor circuit 609 includes front-end RF circuit 614, and mixed signal circuit 616. Controller 618 includes digital block 620 and signal processing block 622.

RF circuit 614 is configured to transmit and receive radar signals (e.g., chirps). RF circuit 614 includes transmitter circuit 610, receiver circuit 612. RF circuit 614 is implemented in a monostatic configuration.

Transmitter circuit 610 and receiver circuit 612 may be implemented in any way known in the art. Mixed signal circuit 616 is configured to control RF circuit 614 to transmit signals (e.g., chirps), and to receive the echo signal. Mixed signal circuit 616 is also configured to translate the RF signals into digital signals that are then transmitted to controller 618.

Mixed signal circuit 616 may be implemented in any way known in the art. For example, in some embodiments, mixed signal circuit 616 includes one or more band-pass filters (BPFs), low-pass filters (LPFs), mixers, low-noise amplifier (LNA), intermediate frequency (IF) amplifiers, phase-locked loops (PLLs) and analog-to-digital converters (ADCs).

Controller 618 is configured to process the signals received from millimeter-wave radar sensor circuit 609 and transmit it to an external processor (not shown in FIG. 6D). Controller 618 may be implemented in any way known in the art, such as a general purpose controller or processor, ASIC, or any other implementation. Controller 618 typically includes digital block 620 for general control purposes (e.g., controlling millimeter-wave radar sensor circuit 609 and interface circuit 624) and a signal processing block 622 for processing the signals received from millimeter-wave radar sensor circuit 609. Digital block 620 may include a finite state machine (FSM).

Signal processing block 622 may be implemented with a digital signal processor (DSP). In some embodiments, signal processing block 622 implements a portion or all of processor 204. In other embodiments, signal processing block 622 is not implemented and, instead, the raw data received from millimeter-wave radar sensor circuit 609 is sent to an external processor (not shown) for further processing. In some embodiments, millimeter-wave radar sensor circuit 609 may be implemented as an FMCW sensor.

Interface circuit 624 is configured to transmit data from controller 618 to the external processor (not shown). Interface 324 may be implemented, for example, using LPWAN (such as SigFox, NBIoT or LoRa). In some embodiments, interface 624 is implemented using wired communication protocols, such as serial peripheral interface (SPI), inter-integrated circuit I²C, inter-IC source (I2S) or others. Other communication protocols, including other low data rate communication protocols, may be used.

Figure 7A:
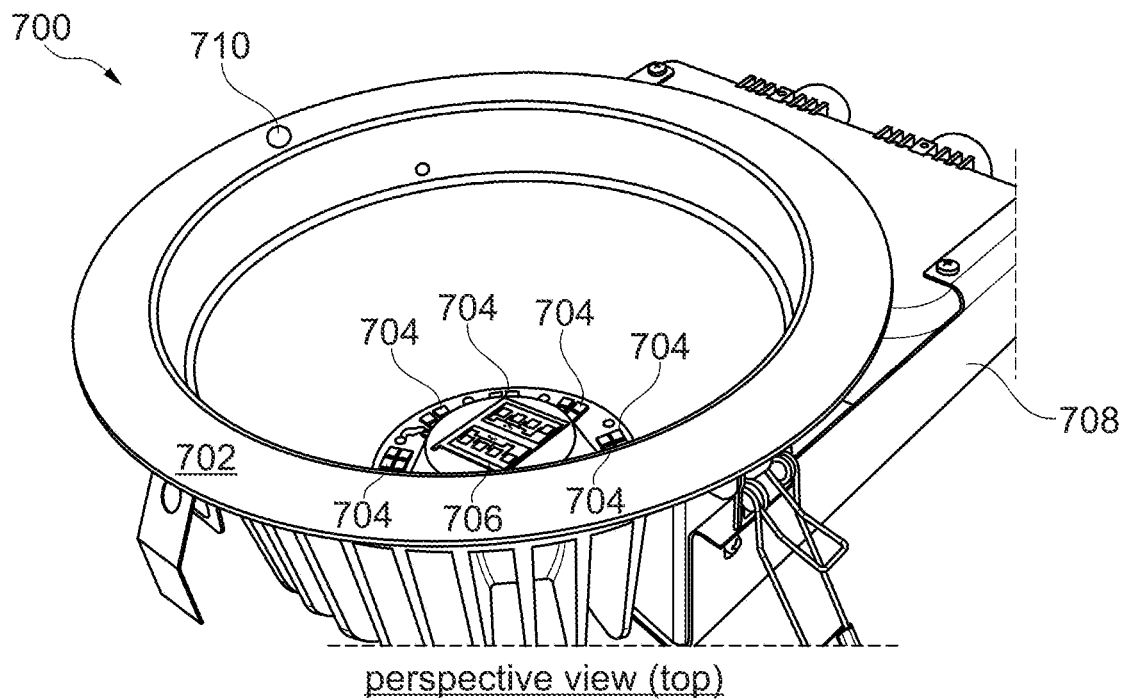
FIGS. 7A and 7B show a perspective view and a top view, respectively, of a LED downlight with an embedded millimeter-wave radar, according to an embodiment of the present invention.
Figure 7B:
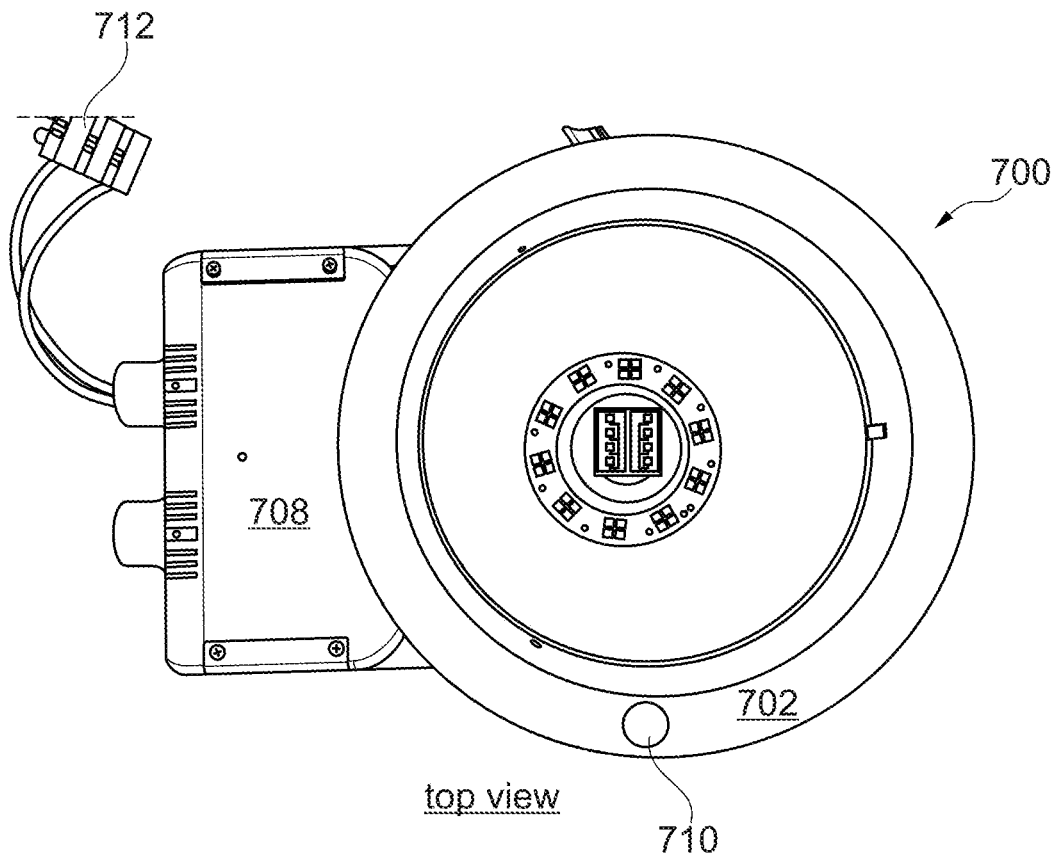
Figure 7C:
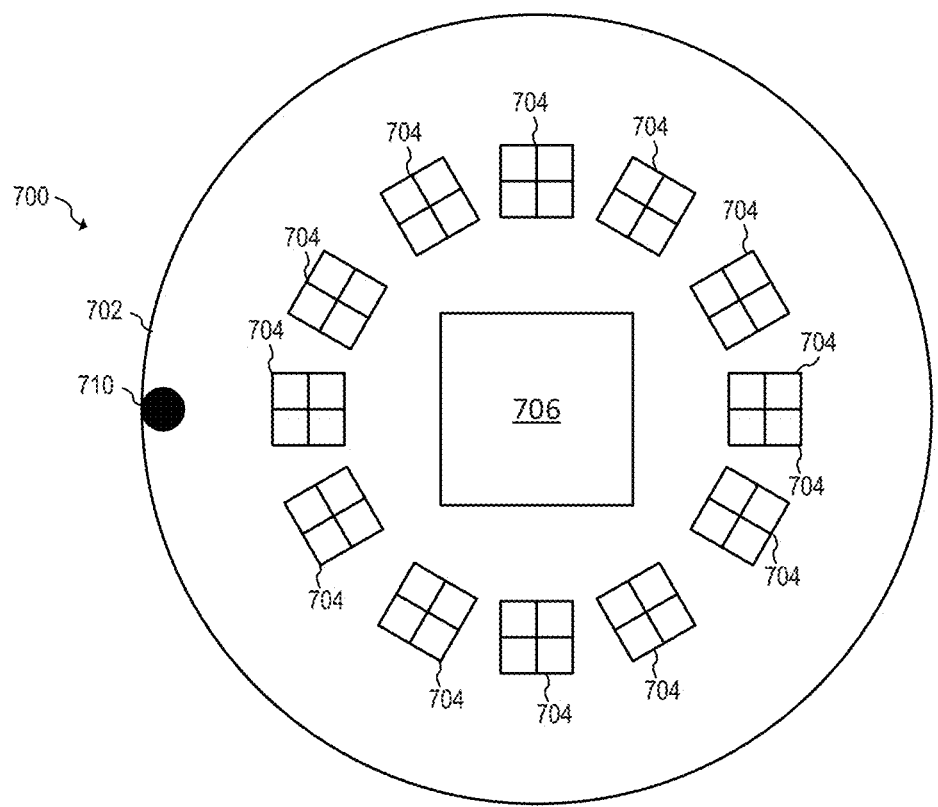
FIGS. 7C and 7D show schematic diagrams of a top view and a cross-sectional view, respectively, of the LED downlight of FIGS. 7A and 7B, according to an embodiment of the present invention.
Figure 7D:
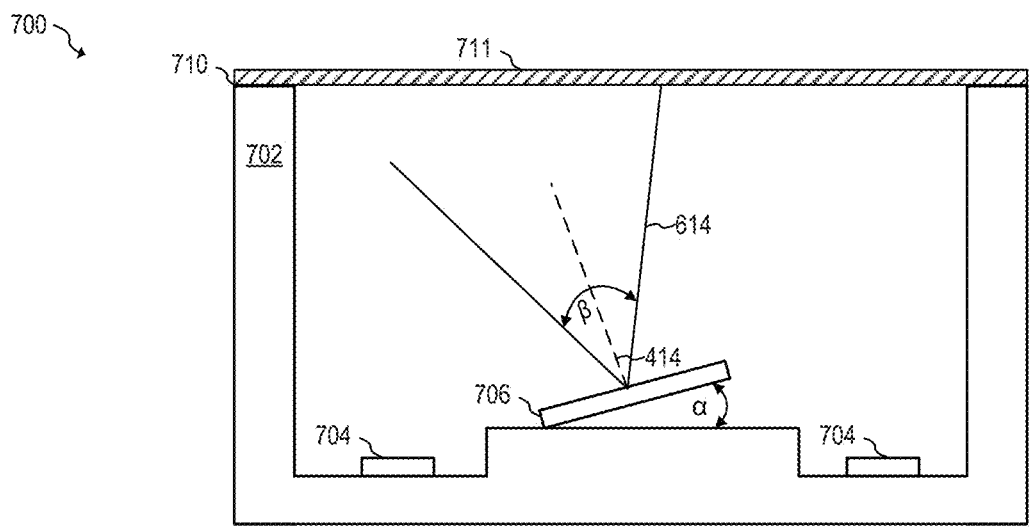

Since radar signals of millimeter-wave radars, such as millimeter-wave radars 302, 404, and 504, can penetrate materials such as plastic, it is possible to embed a millimeter-wave radar into a light fixture, such as a LED downlight having a plastic cover. For example, FIGS. 7A and 7B show a perspective view and a top view, respectively, of LED downlight 700 with an embedded millimeter-wave radar, according to an embodiment of the present invention. FIGS. 7C and 7D show schematic diagrams of a top view and a cross-sectional view, respectively, of LED downlight 700, according to an embodiment of the present invention.

LED downlight 700 includes housing 702 and enclosure 708. Housing 702 includes a plurality of LEDs 704, and printed circuit board (PCB) 706. PCB 706 includes a millimeter-wave radar, such as monostatic millimeter-wave radar 504. Enclosure 708 includes power connector 712, and supporting circuitry. Optional market 710 may be included in housing 702 as a reference for direction (e.g., to be facing an entrance), as explained below.

As illustrated in FIGS. 7A-7D, LEDs 704 surround PCB 706. As shown, such arrangement allows embedding PCB 706 without obstructing the light generated by LEDs 704.

In some embodiments, PCB 706 may include monostatic millimeter-wave radar 504. In such embodiments, and as shown in FIG. 7D, PCB 706 is disposed over the horizontal plane at an angle α. Such arrangement allows for achieving the angle α illustrated in FIG. 5A.

Marker 710 is optionally included to indicate the direction of field-of-view 614. Such marker is advantageous, e.g., when installing LED downlight (e.g., at an entrance), such that the millimeter-wave radar determines which direction corresponds to humans entering the entrance and which direction corresponds to humans exiting the entrance.

Housing 702 is implemented with metal. Cover 711 is typically implemented with plastic. In some embodiments, cover 711 may be implemented with glass.

Since radar signals of millimeter-wave radars can penetrate the materials of cover 702, millimeter-wave radars, such as millimeter-wave radars 300, 404 and 504 are capable of operating (e.g., detecting humans and humans' movements) while embedded inside housing 702 and covered by cover 711.

Advantages of some embodiments include that a millimeter-wave radar may be embedded inside the housing of a light fixture without impact on aesthetics (e.g., the millimeter-wave radar may be invisible to a human crossing the plane). In some embodiments, a conventional housing of a light fixture has an embedded millimeter-wave radar without altering the housing shape. It is thus possible to implement, e.g., human detection and tracking functions, using existing light fixture designs. By embedding a millimeter-wave radar inside the light fixture, it is possible to perform functions such as human detection and tracking by using existing infrastructure and without using dedicated sensors that are installed separately. Some embodiments may exhibit an associated price/cost benefit for the user as a result of avoiding costly redesigns of existing infrastructure (e.g., existing building infrastructure) or installation of additional dedicated hardware.

Figure 7E:
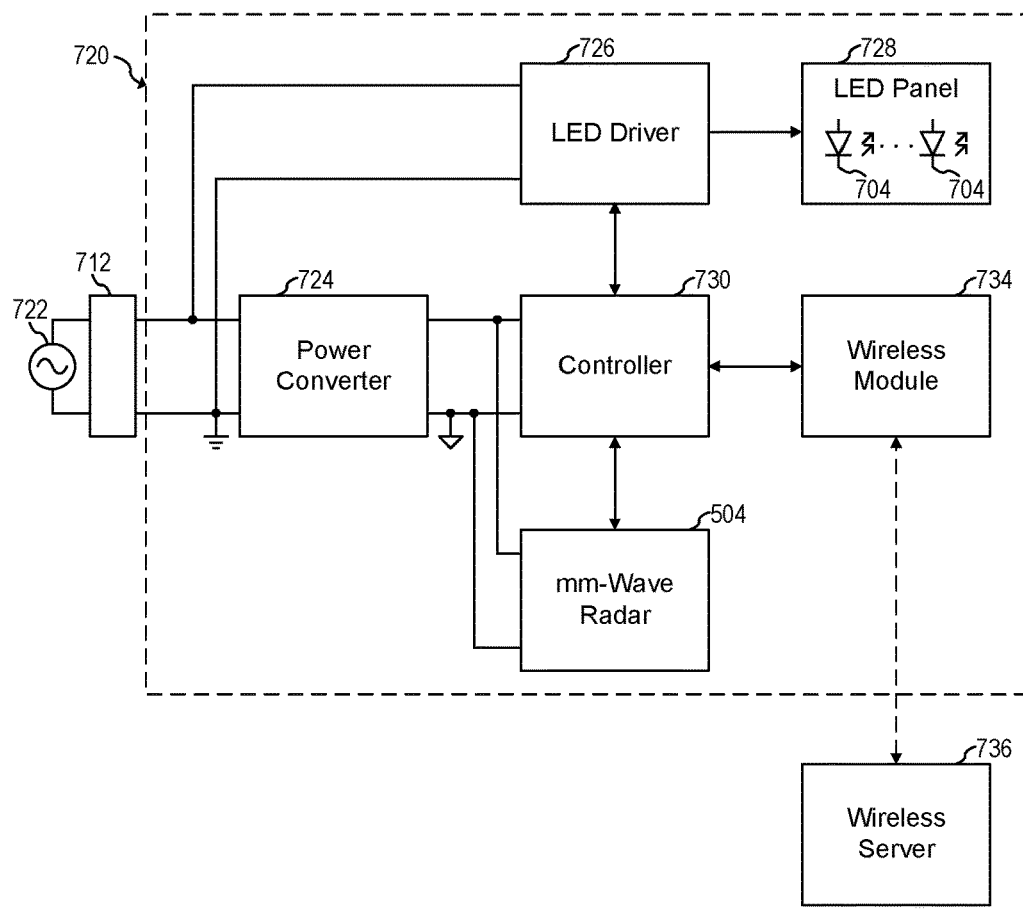
FIG. 7E shows an electrical schematic of a circuit of the LED downlight of FIGS. 7A-7D, according to an embodiment of the present invention.

FIG. 7E shows an electrical schematic of circuit 720 of LED downlight 700, according to an embodiment of the present invention. Portions of circuit 720 may be implemented, for example, in enclosure 708 and PCB 706. Circuit 720 includes power converter 724, controller 730, LED driver 726, millimeter-wave radar 504, wireless module 734, and LED panel 728.

During normal operation, circuit 720 is connected to AC power source 722 using connector 712. Power converter 724 converts the AC power provided by AC power source 722 into DC power. The DC power provided by power converter 724 is provided to controller 730 and millimeter-wave radar 504. LED driver receives power from AC power source 722 and drives LED panel 728 based on instructions received from controller 730. Millimeter-wave radar 504 performs human detection, such as described with respect to FIG. 5A, and transmits the associated data to controller 730. Controller 730 receives data from millimeter-wave radar 504 (e.g., human detection data), LED driver 726 (e.g., LED status) and/or power converter 724 (e.g., telemetry data) and transmits such data to wireless module 734. Wireless module 734 transmits the data from controller 730 to wireless server 736. Wireless module 734 may also receive data from wireless server 736 (e.g., instructions for dimming LEDs 704) and transmits it to controller 730.

Wireless module 734 may communicate with wireless server 736 using LPWAN protocols, such as SigFox, NBIoT or LoRa. Using an LPWAN protocol has the advantage of being capable of operating without user configuration. For example, in some embodiments, wireless module 734 is preconfigured during manufacturing. When a user installs LED downlight 700, e.g., in a ceiling near an entrance of a shopping mall, and provides power (e.g., using connector 712), wireless module 734 automatically establishes (e.g., anonymously) communication with wireless server 736.

Modern LPWAN protocols, such as SigFox, NBIoT or LoRa, use a narrow-band sub-gigahertz frequency communication channel, which are more effective in penetrating, e.g., metal ceilings of modern buildings compared with existing gigahertz communication channels, such as Wifi or Bluetooth. Using modern LPWAN protocols for the wireless communication, therefore, also has the advantage of allowing effective wireless communications in modern buildings, e.g., that have metal ceilings.

AC power source 722 may be, for example, a 120 $V_{rms}$, 60 Hz power source or a 230 $V_{rms}$, 50 Hz. Other AC power sources may be used.

Power converter 724 may be implemented in any way known in the art. For example, power converter 724 may be implemented as a switched mode power supply (SMPS), for example. In some embodiments, power converter 724 may provide different voltage rails for different devices, such as a 3.3V rail for controller 730 and a 5 V rail for millimeter-wave radar 504. In some embodiments, power converter 724 may include a charger circuit for charging a battery (not shown) configured to provide power if AC power source 722 becomes temporarily unavailable.

LED driver 726 may be implemented in any way known in the art. For example, LED driver 726 may be implemented as a current controlled SMPS. In some embodiments, LED driver 726 is capable of dimming LEDs 704. In some embodiments, LED driver 726 receives DC power instead of AC power.

Controller 730 may receive data from millimeter-wave radar 504, power converter 724 and/or LED driver 726. For example, controller 730 may receive data associated with human detection (e.g., humans entering or exiting an entrance, count of humans over a period of time, etc.) from millimeter-wave radar 504. In some embodiments, controller 730 may receive data associated with status of the grid (e.g., voltage and frequency of AC power provided by AC power source 722) from power converter 724 and/or LED driver 726.

In some embodiments, LED driver 726 may monitor parameters such as input voltage, power consumption of LED panel 728, etc. Controller 730 may receive data of the monitored parameters, e.g., real time, from LED driver 726. In some embodiments, controller 730 may estimate characteristics of LED panel 728 or one or more LEDs 704, such as LEDs failures or end-of-life warnings, lumens produced, etc., and transmit such information to wireless server 736. In some embodiments, controller 730 may transmit the data received from LED driver 726 to wireless server 736 and wireless server 736 may estimate parameters such as such as LEDs failures or end-of-life warnings, lumens produced, etc.

In some embodiments, controller 730 may receive data from external sources, such as other sensors (e.g., luminosity sensors, humidity sensors, temperature sensors, etc.) that are coupled to LED downlight 700 either directly or, in some embodiments, wirelessly. For example, in some embodiments, LED downlight 700 includes an embedded temperature sensor (not shown) to monitor the temperature of LEDs 704. The temperature of LEDs 704 may be indicative, for example, of the luminosity produces by LEDs 704.

Controller 730 may receive data and/or instructions from wireless server 736 and may use such information to dynamically adjust parameters of, e.g., LED driver 726, and millimeter-wave radar 504. For example, in some embodiments, controller 730 may receive from wireless server 736 instructions to dim (i.e., reduce luminosity), brighten (i.e., increase luminosity), turn on, or turn off, one or more LEDs 704. As another non-limiting example, controller 730 may receive from wireless server 736 instructions to dynamically change a data collection method or processing technique of millimeter-wave radar 504. In some embodiments, controller 730 may receive from wireless server 736 recalibration instructions dynamically to optimize for, e.g., operation at a particular height. Controller 730 may control, e.g., LED driver 726 and millimeter-wave radar 504 according to the instructions received from wireless server 736.

In some embodiments, controller 730 may dim, brighten, turn on, or turn off one or more LEDs 704 based on data from millimeter-wave radar 504 and without relying on instruction from wireless server 736. For example, in some embodiments, such as in a store having a single entrance, controller 730 may dim LEDs 704 when the number of humans inside the (e.g., the store), e.g., as determined by subtracting the number of humans exiting the location from the number of humans entering the location, is below a threshold, such as 5 humans. Controller 730 may brighten LEDs 704 when the number of humans inside the location increases above, e.g., 10 humans.

Controller 730 communicates with millimeter-wave radar 504, LED driver 726 and wireless module 734 using communication protocols known in the art. For example, some embodiments implement wired communication protocols, such as SPI, I$^2$C, I2S, Universal asynchronous receiver-transmitter (UART), or others. Some embodiments, implement wireless communication protocols for such communication, such as Bluetooth, WiFi, or others.

Controller 730 may be implemented as a general purpose processor, controller or digital signal processor (DSP). In some embodiments, controller 730 may be implemented as a custom application specific integrated circuit (ASIC). In some embodiments, controller 730 includes a plurality of processors, each having one or more processing cores. In other embodiments, controller 730 includes a single processor having one or more processing cores.

In some embodiments, controller 730 includes controller 618. In other embodiments, controller 618 is implemented separately from controller 730.

PCB 706 includes a millimeter-wave radar, such as millimeter-wave radars 404 or 504, such as shown in FIG. 6A-6D. In some embodiments, PCB 706 includes a portion of the millimeter-wave radar, such as the transmitting/receiving antenna, while other components of the millimeter-wave radar are implemented elsewhere. PCB 706 may be implemented in any way known in the art. For example, PCB 706 may be implemented as a flexible PCB or as a non-flexible PCB. PCB 706 may be implemented with a combination of low dielectric constant materials and FR4. In some embodiments, PCB 706 may be implemented with purely FR4 if carefully designed. Other types of materials may also be used.

Wireless server 736 may be a remote server. For example, in some embodiments, wireless server 736 is a server located miles away from LED downlight 700, such as in a centralized server farm. In some embodiments, wireless server 736 is connected to the cloud and may be accessed, e.g., via the Internet, by a personal computer, smartphone, tablet, or other electronic device.

Advantages of some embodiments include that a millimeter-wave radar embedded in a light fixture may operate by using existing power source connections. In some embodiments, the wireless communication channel used to transfer information from the millimeter-wave radar (or other source of data inside the light fixture) to a wireless server or to provide instructions from a wireless server to control parameters of the light fixture is advantageously preconfigured and operates without human intervention. Thus, some embodiments advantageously exhibit plug-and-play capability. In other words, in some embodiments, a user installs the light fixture having an embedded millimeter-wave radar by connecting the light fixture to AC power and, after power-up, the user has access to data collected by the millimeter-wave radar (e.g., number of humans entering or exiting an entrance) by using an electronic device (e.g., a smartphone, computer, or tablet) without additional configuration of the light fixture. In some embodiments, the plug-and-play capability extends to allow the user control of parameters of the light fixture, such as, for example, changing the brightness level of one or more LEDs.

Figure 7F:
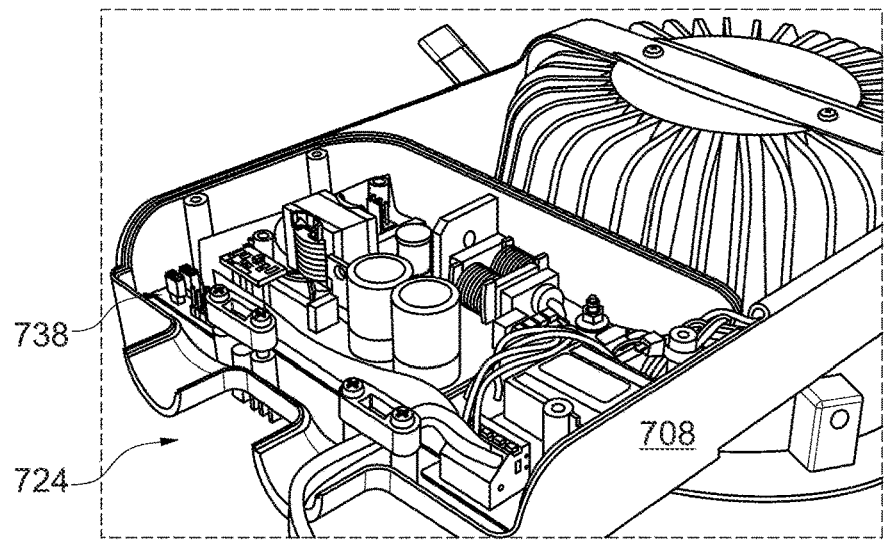
FIGS. 7F and 7G show a perspective view of portions of the circuitry inside the enclosure of the LED downlight of FIGS. 7A-7E, according to an embodiment of the present invention.
Figure 7G:
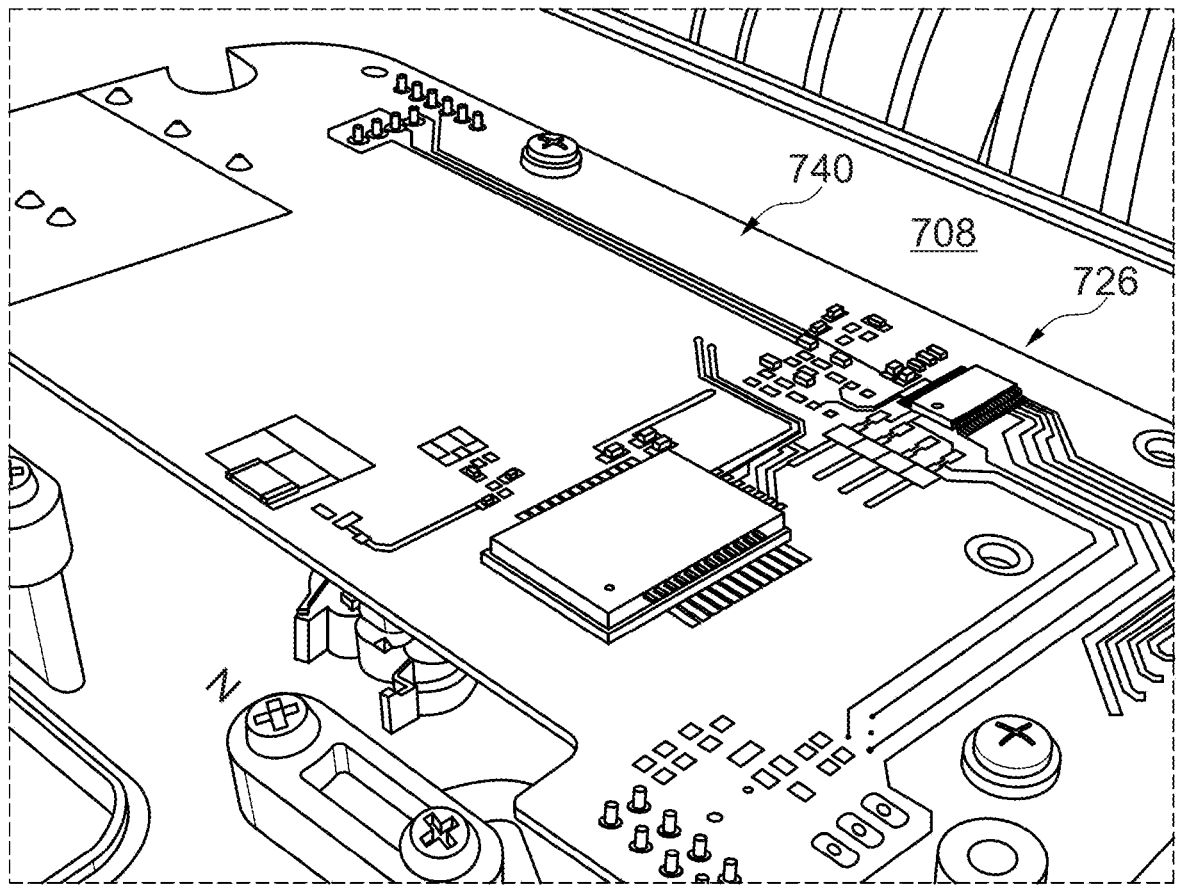

FIGS. 7F and 7G show a perspective view of portions of the circuitry inside enclosure 708, according to an embodiment of the present invention. As shown in FIG. 7F, enclosure 708 includes PCB 738. PCB 738 includes power converter 724, controller 730 (not shown) and wireless module 734 (not shown). As shown in FIG. 7G, enclosure 708 also includes PCB 740 that includes LED driver 726. Some embodiments may implement the circuitry inside enclosure 708 in a different manner (e.g., using a single PCB or more than two PCBs. For example, some embodiments may implement some of the circuitry shown in FIGS. 7F and 7G inside housing 702 (such as in PCB 706).

LED downlight 700 includes monostatic millimeter-wave radar 504. In some embodiments, LED downlight 700 may be implemented with other types of millimeter-wave radars, such as, for example, millimeter-wave radar 404.

Figure 8A:
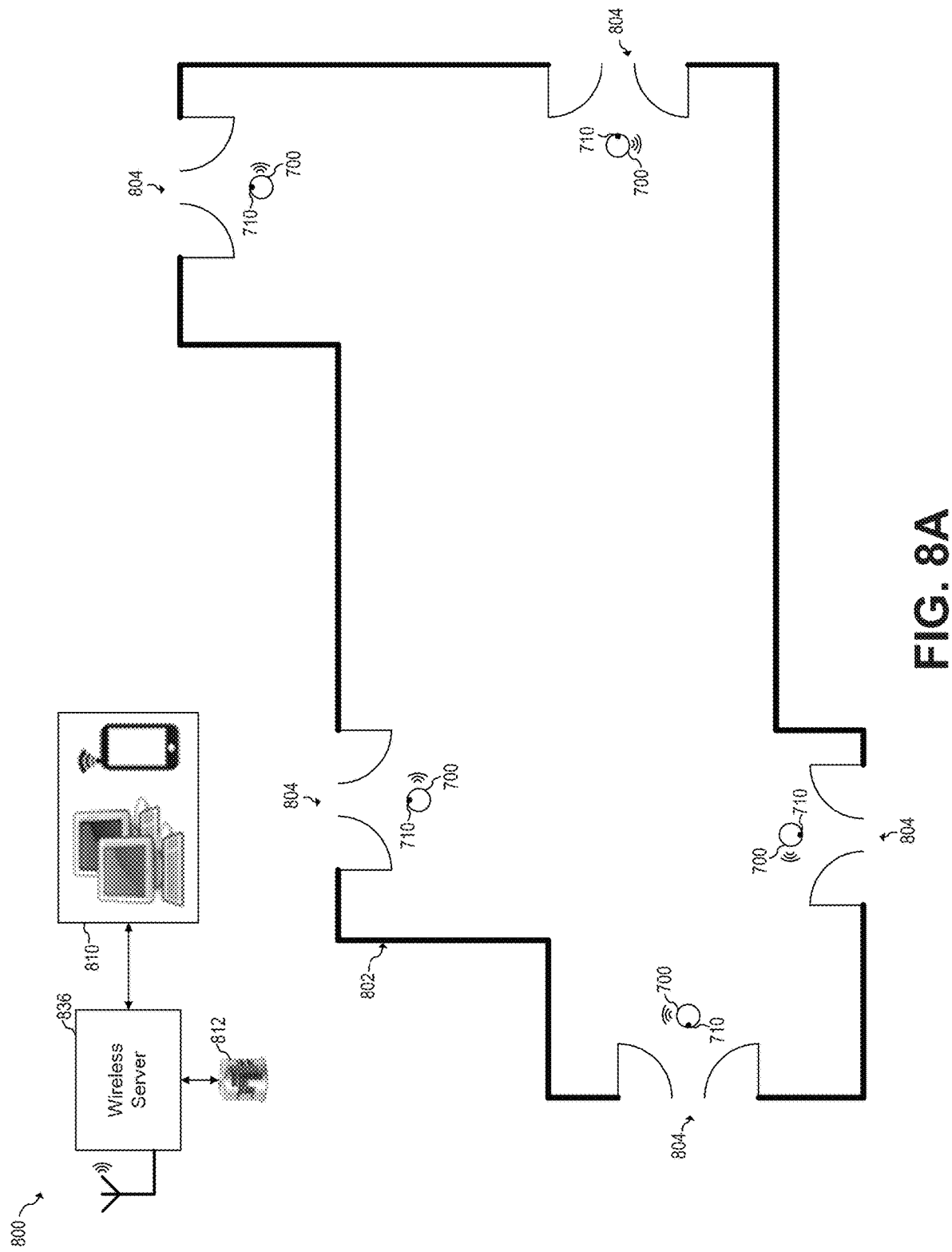
FIG. 8A shows a top view of a schematic diagram of a building that includes a plurality of the LED downlights of FIGS. 7A-7G, according to an embodiment of the present invention.

FIG. 8A shows a top view of a schematic diagram of building 802 that includes system 800, according to an embodiment of the present invention. System 800 includes a plurality of LED downlights 700 and wireless server 836.

Building 802 includes a plurality of entrances 804. A LED downlight 700 is disposed in front of each entrance 804. As shown in FIG. 8A, each LED downlight 700 is oriented towards respective entrances 804, as indicated by optional market 710.

Wireless server 836 communicates with each LED downlight 700 using an LPWAN protocol, such as SigFox, NBIoT or LoRa. Upon installation of LED downlight 700 (e.g., providing power to LED downlight 700), each LED downlight 700 communicates with wireless server 836. For example, in some embodiments, each LED downlight periodically transmits a log that includes each human detected, a time stamp of the human detected, and the direction of the human detected (e.g., entering or exiting the respective entrance).

In some embodiments, wireless server 836 stores, for each sampled point (e.g., for each log record), the device id (to identify which LED downlight 700 is associated with the data), a time stamp (e.g., day and time to identify period of detection), number of humans approaching the entrance (e.g., entering building 802), number of humans leaving the entrance (e.g., exiting building 802), the entrance id (to identify the entrance, which may be derived from the device id), and a description field (e.g., such as "mini bus entrance," "coffee shop entrance," etc.).

In some embodiments, each LED downlight 700 periodically reports to wireless server 836 how many humans have entered/exited during an associated period. For example, every, e.g., 5 minutes, each LED downlight 700 reports how many humans entered and exited during such 5 minutes. In other embodiments, each LED downlight 700 asynchronously reports to wireless server 836 that a human has been detected entering/exiting the entrance.

Wireless server 836 performs data management and stores information received from each LED downlight 700, for example, in database 812. Wireless server 836 may also aggregate and process information from each LED downlight 700 and make it accessible to external electronic devices 810. For example, wireless server may compute how many humans are inside building 802 by adding all humans entering building 802 and subtracting all humans exiting building 802.

Wireless server 836 may also determine peak hours of operation (hours with the most number of humans), average number of humans, and other metrics based on data gathered from LED downlights 700.

Wireless server 836 may also determine, for example, expected life remaining for each LED downlight 700. For example, the power consumption of a LED light goes down near end of light. LED downlight 700 may monitor the power consumption of its associated LEDs 704 to determine LEDs 704 end-of life. Such information (e.g., power consumption of LEDs 704 and/or end-of-life estimates) may be transmitted to wireless server 836, which then may alert a user of potential lighting disruptions. Wireless server 836 may also automatically compensate for a decrease in luminosity of a near-end-of-life LED downlight by adjusting the brightness of such LED.

Wireless server 836 may also receive telemetry information (e.g., voltage and frequency of AC power source 722) from each LED downlight 700 and make such data available to a user (e.g., via electronic devices 810). Telemetry information may also be used, for example, to confirm that an action, such as turning on or off LED downlight 700, was actually carried out. As another example, the telemetry information may be used to confirm which dimming level is currently in operation (e.g., based on power consumption of LED panel 728).

Wireless server 836 may also control one or more LED downlights 700 based on the information from each LED downlight 700, as well as from external devices 810. For example, wireless server 836 may dim downlights 700 (by, e.g., instructing respective controllers 730 using the LPWAN) when the number of humans inside building 802 (or a portion of building 802) is below a threshold (e.g., 20 humans). In some embodiments, electronic devices 810 may be used to control one or more LED downlights 700. For example, a smartphone may be used to turn on, off, or change the brightness of one or more LED downlights 700, e.g., using an app in a smartphone.

Electronic devices 810 include, for examples, personal computers, smartphones and tablets. Electronic devices 810 may communicate with wireless server 836, for example, via the Internet. For example, electronic devices 810 may access data contained in wireless server 836 by logging into a website or using an app.

Wireless server 836 may, for example, use a cloud computing platform (such as Amazon Web Services, Microsoft Azure, and Google Cloud platform) to host data, and app and website servers to communicate with electronic devices 810, e.g., via the Internet.

In some embodiments, wireless server 836 may store historic data of one or more LED downlights 700 and use such data to predict behavior and dynamically adjust LED downlights 700 based on such predictions. For example, data mining techniques may be used to predict peak human traffic on a location on a particular day (e.g., a typical rainy Saturday). Such prediction may be used to dynamically adjust the dimming of LED lights 700. Such data and predictions may also be used, e.g., to calculate previous electricity usage of LED downlights 700 and to estimate projected electricity usage of LED downlights 700. In some embodiments, artificial intelligence (AI) and machine learning algorithms may be used to optimize the dynamic control of LED lights 700.

Building 802 may be, for example, a shopping mall, office building, or factory. Other buildings, such as a residential house, convention center, hotel, or other, may also be used. It is understood that system 800 may also be implemented outside a building. For example, in some embodiments, system 800 may be implemented in street lights to determine human traffic, e.g., in the sidewalks. The form factor and other characteristics may be adapted to be suitable for the particular application. For example, a street light may be designed to be weatherproof.

Advantages of some embodiments include that a building may implement a system such as system 800 by replacing existing downlights with downlights implementing with downlights according to embodiments of the present invention. Since LED downlights 700 operate by using a similar interface than conventional downlights (e.g., connector 712 receiving AC power from the grid) and incorporates the millimeter-wave radar inside housing 702, some embodiments implement system 800 in a building without impact to aesthetic and without installing additional sensors or wiring. Some embodiments may reuse 100% of existing infrastructure (e.g., wiring, ceiling pockets, etc.).

Using millimeter-wave radars inside downlights has the advantage of achieving a large coverage range (e.g., greater than 10 meters in the x-axis), in part, because radar signals from the millimeter-wave radar can penetrate plastic. The capability of being dynamically calibrated advantageously allows for installing the same downlight model at different heights and under different conditions without impacting performance.

Using millimeter-wave radars has the additional advantage of avoiding privacy issues associated with capturing and storing images of humans and performing facial recognition and other signal processing techniques with such images.

Embodiments using LPWAN protocols have additional advantages, such as avoiding wireless configuration steps when installing the downlights in the building. Using LPWAN also has the advantage of allowing effective wireless communications in modern buildings, e.g., buildings that have metal ceilings, because of LPWAN's usage of narrow-band sub-gigahertz frequency communication channels.

Using LPWAN protocols is possible, in part, thanks to the relatively low data usage and low complexity of system 800. For example, it is possible to count human entering and exiting an entrance locally in the LED downlight without complex radar signal processing, thereby transmitting a small log file/data (e.g., containing time stamp and direction of detection) periodically. Alternatively, data of detected humans may be transmitted to the wireless server for remote processing (e.g., remotely determining direction of human movement or filtering out noise).

Additional advantages of some embodiments include that human counting and monitoring may be performed automatically twenty-four hours a day, seven days a week. For example, human counting may continue through the night and holidays without user intervention. Autonomous interaction between the wireless server and each of the downlights is advantageously possible. In other words, the wireless server may dynamically adjusts the state of the downlights (e.g., on/off and dimming state) based on current human detection as well as historic data and estimated human traffic without user intervention.

In some embodiments, wireless server 836 may use artificial intelligence (AI) and machine learning algorithms to process data from LED downlights 700. For example, in some embodiments, correlation between human detection of various LED downlights 700 may be used to estimate human flow inside building 802.

Although FIG. 8A shows a single LED downlight 700 per entrance, more than one LED downlights 700 may be used per entrance. Some embodiments may also use LED downlights 700 inside the building (not only at the entrances) to, e.g., monitor human flow inside the building.

Some embodiments may be adapted to detect other objects, such as cars. For example, some embodiments may detect the number of cars moving, their associated speeds, and car congestion using system 800 implemented in street lights and/or traffic lights. As another example, some embodiments may determine, e.g., using millimeter-wave radars embedded in traffic lights, the number of cars crossing a first intersection in a first direction, and a second intersection subsequent the first intersection in the first direction. Machine learning and AI algorithms may then be used to adjust the timing of the red and green lights of the first and second traffic lights to, e.g., reduce car congestion.

Figure 8B:
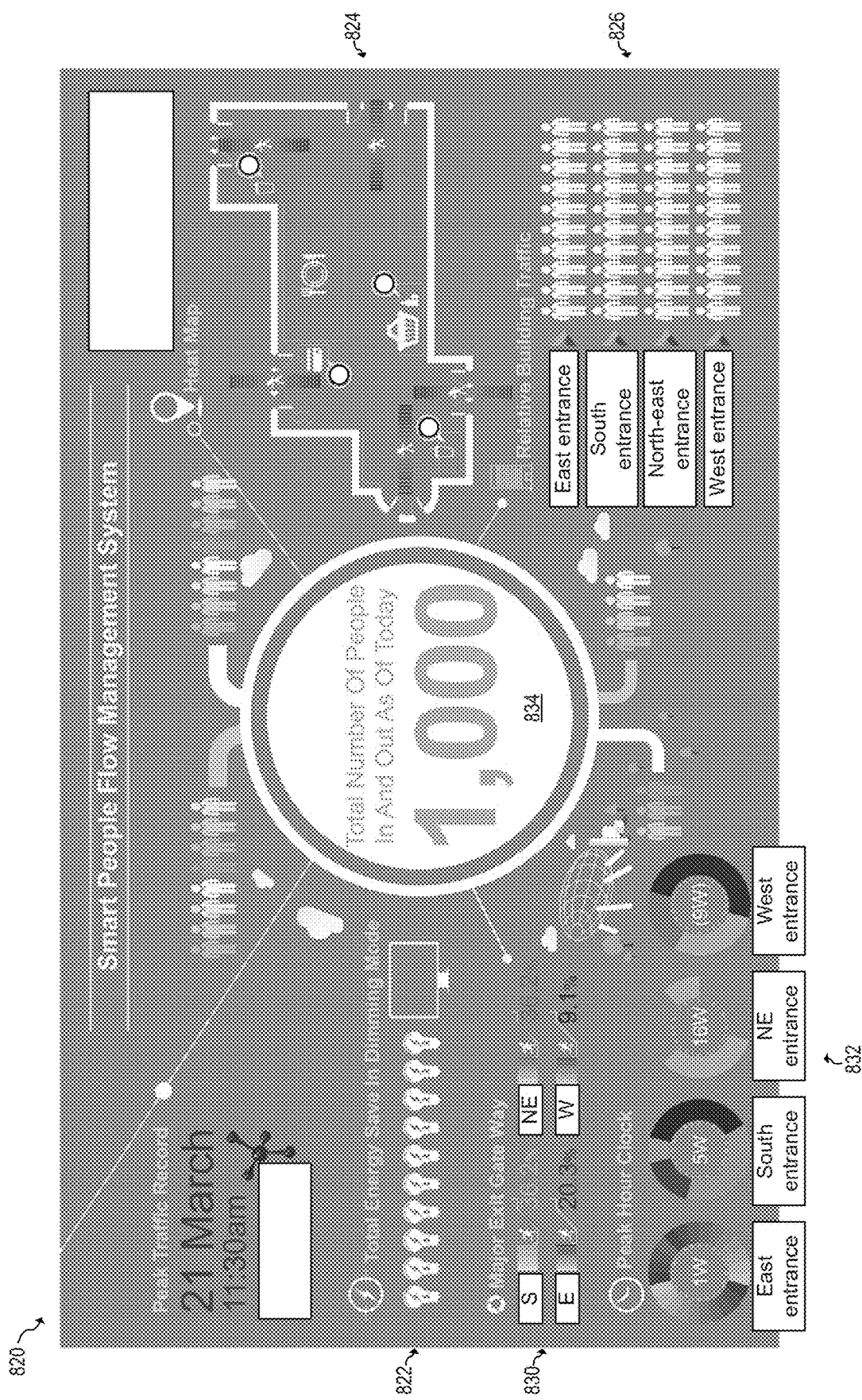
FIG. 8B shows a graphical user interface (GUI) that may be used to access the wireless server of FIG. 8A, according to an embodiment of the present invention.

FIG. 8B shows graphical user interface (GUI) 820 that may be used to access wireless server 836, according to an embodiment of the present invention. GUI 820 is a non-limiting example of a possible GUI to interface with wireless server 836. Other user interfaces, including other GUIs, are also possible. GUI 820 includes building diagram 824, relative building traffic diagram 826, peak hour diagram 832, major exit gate diagram 830, energy savings diagram 822, and total human traffic diagram 834.

Building diagram 824 is a diagram of building 802 and displays in real time how many humans are entering and exiting building 802 on each entrance. For example, the bars next to the human symbol in each entrance may be used to indicate the number of humans entering building 802 (e.g., the bars towards the inside of building 802 with respect to the human symbol) and the number of humans exiting building 802 (e.g., the bars towards the entrance of building 802 with respect to the human symbol), with the number of bars being indicative of the number of humans entering/exiting building 802. In some embodiments different colors may be used for the bars (e.g., red for entering and blue for exiting).

Relative building traffic diagram 826 displays the relative human traffic of each entrance 804 for, e.g., the current day (only 4 entrances are displayed in relative building traffic diagram 826 for clarity purposes). For example, the number of human symbols next to each entrance represents the relative number of humans entering and exiting a particular entrance with respect to other entrances. In the example shown, all entrances displayed have similar human traffic.

Peak hour diagram 832 displays in each hollow circle the relative number of human traffic per hour in the respective entrance, e.g., using different shades of a color, for the current day (only 4 entrances are displayed in this example for clarity purposes). For example, each hollow circle is divided in 24 equal portions, and a darker color in a particular portion of the 24 portions indicates higher human traffic than lighter colors. In the example shown, the south entrance has higher traffic between 1 m and 10 am and between 7 pm and 11 pm. The peak human traffic for the east entrance is at 1 pm and at 11 pm.

Major exit gate diagram 830 displays the percentage of exiting traffic per entrance for the current day (only 4 entrances are displayed in this example for clarity purposes). In the current example, for the current day, 20.3% of humans exited building 802 using the east entrance, 36.2% of humans exited building 802 using the south entrance, 36.2% of humans exited building 802 using the north-east entrance, and 9.1%% of humans exited building 802 using the west entrance.

Total human traffic diagram 834 displays total number of humans entering and exiting all entrances for the current day. In the current example, 1000 humans entered or exited an entrance of building 802 during the current day.

Energy savings diagram 822 displays how much electricity has been saved during the current day as a result of dimming LED downlights 700 when human traffic is low. For example, the number of light-bulbs in energy savings diagram 822 is indicative of the number of kW saves as a result of dimming one or more LED downlights 700.

Figure 9:
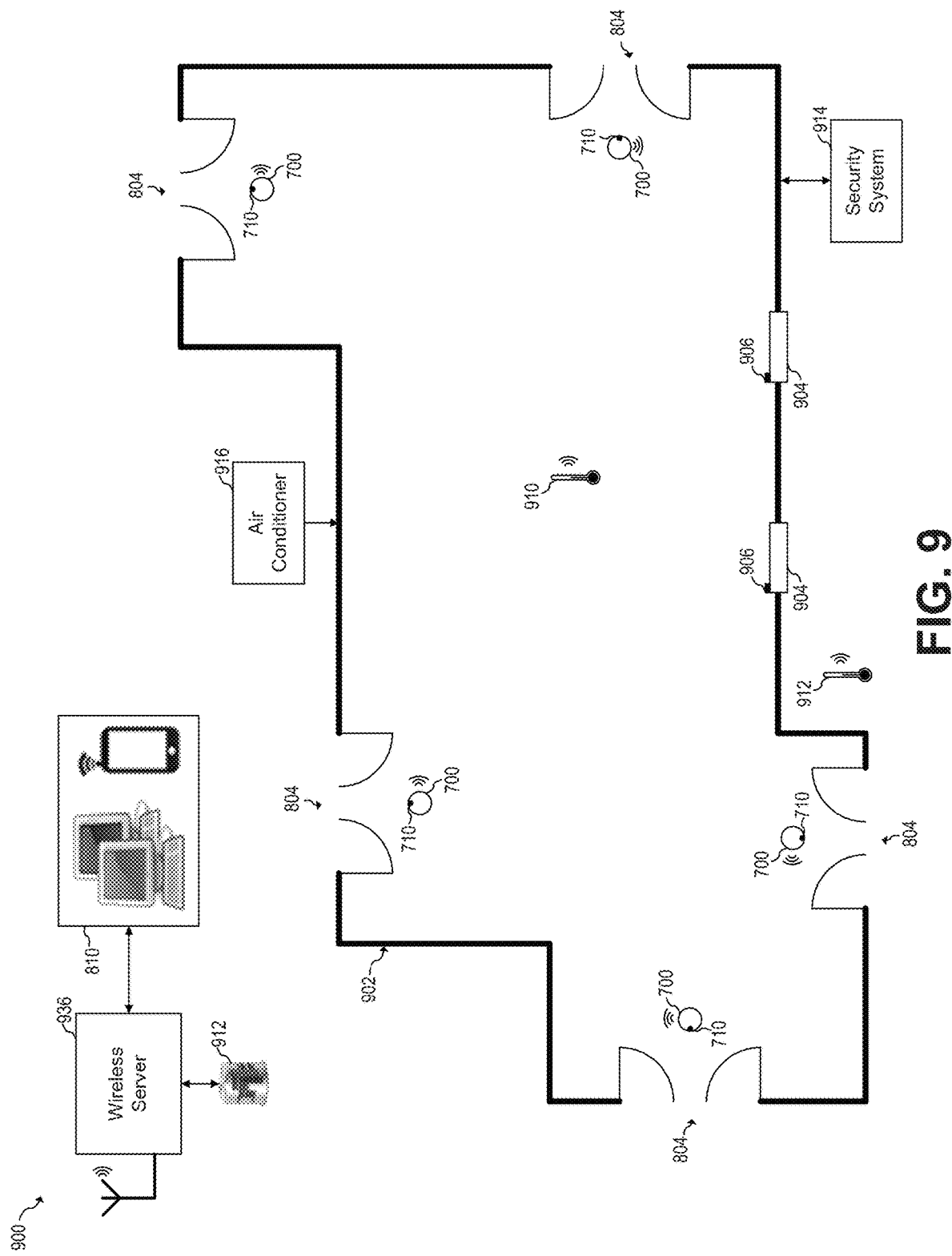
FIG. 9 shows a top view of a schematic diagram of a building that includes the plurality of the LED downlights of FIGS. 7A-7G, according to another embodiment of the present invention.

Some embodiments may integrate system 800 with other types of sensors. For example, FIG. 9 shows a top view of a schematic diagram of building 902 that includes system 900, according to an embodiment of the present invention. System 900 includes a plurality of LED downlights 700, inside temperature sensor 910, outside temperature sensor 912, pressure sensors 906, and wireless server 936.

System 900 may operate in a similar manner than system 800. System 900, however, is capable of interacting with additional sensors, such as temperature sensors 910 and 912, and pressure sensors 906. System 900, therefore, may advantageously use information from such additional sensors to dynamically adjust LED downlights 700 and external systems, such as air conditioner 916, and security system 914. For example, some embodiments, may use the current and/or estimated number of humans inside building 902, current and/or estimated building temperature (e.g., from inside temperature sensor 910) and current and/or external temperature (e.g., from outside temperature sensor 912) to control air conditioner 916.

As another non-limiting example, some embodiments may use human detection capabilities of downlights 700 together with pressure sensors 906 (located in windows 904) to trigger security system (e.g., alarm siren, police call, etc.). Security system may also dynamically adjust the brightness of LED downlights 700 based on, e.g., intrusion detections. For example, in some embodiments, pressure sensor 906 may report to wireless server 936 that a window was broken, wireless server may then turn on all LED downlights 700 at full brightness.

In some embodiments air conditioner 916 and alarm system 914 communicate with wireless server 936 via the Internet. In other embodiments, air conditioner 916 and security system 914 communicated with wireless server 936 using LPWAN protocols. Other communication channels may also be used.

In some embodiments, wireless server 936 may implement data mining, AI and machine learning algorithms to data associated with external sensors (in addition to data from LED downlights 700). Other tasks, such as estimation of electricity consumption associated with the air conditioner, control of air conditioner, alarm system and control of other systems, are also possible.

Advantages of some embodiments include enabling various systems (e.g., human detection, lighting, air conditioner, and security/alarm systems, among others) to interact seamlessly without human intervention. In some embodiments, the wireless server advantageously serves as a gateway for smart buildings and allows for the addition of additional sensors and systems.

Figure 10:
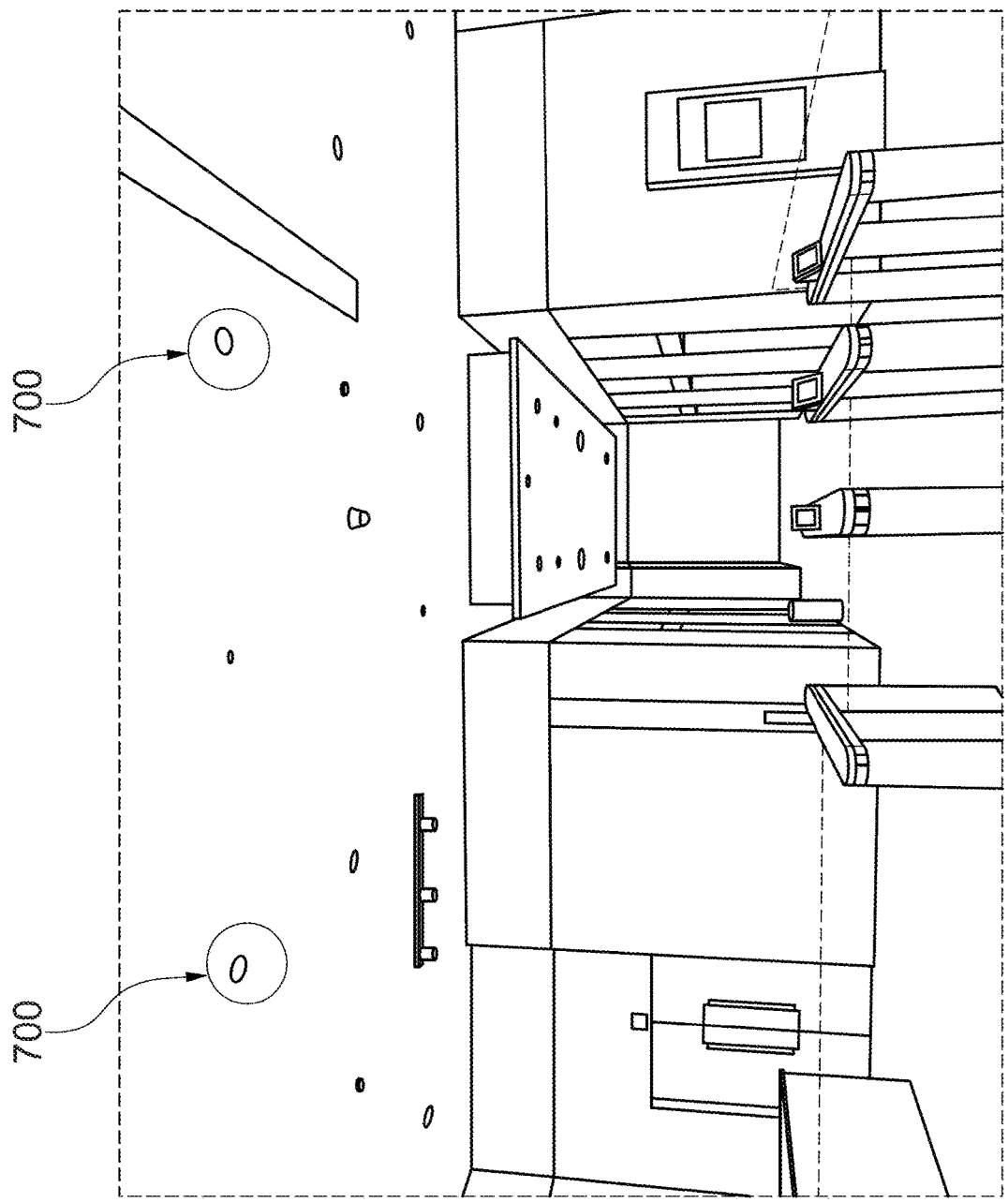
FIG. 10 shows LED downlights of FIGS. 7A-7G installed on a ceiling, according to an embodiment of the present invention.

FIG. 10 shows LED downlights 700 installed on a ceiling, according to an embodiment of the present invention. As shown, two LED downlights 700 are used in a security entrance inside a building (which may be inside an office building or an airport, for example). As shown, LED downlights 700 are aesthetically similar to other LED downlights in the entrance.

Example embodiments of the present invention are summarized here. Other embodiments can also be understood from the entirety of the specification and the claims filed herein.

Example 1. A downlight including: a plurality of light emitting diodes (LEDs) disposed in a housing of the downlight; and a millimeter-wave radar including: an antenna disposed in the housing, a controller configured to: detect a presence of a human in a field-of-view of the millimeter-wave radar, determine a direction of movement of the detected human, and produce log data based on the direction of movement of the detected human, and a wireless module configured to transmit the log data to a wireless server.

Example 2. The downlight of example 1, where the field-of-view of the millimeter-wave radar includes a centerline that has an angle with respect to a vertical axis that is different than 0°.

Example 3. The downlight of one of examples 1 or 2, where the antenna is disposed in a printed circuit board (PCB), where the plurality of LEDs are disposed around the PCB.

Example 4. The downlight of one of examples 1 to 3, where the antenna is integrated in an integrated circuit that includes the millimeter-wave radar, and where the angle is between 5° and 15°.

Example 5. The downlight of one of examples 1 to 4, where the antenna is disposed in a printed circuit board (PCB), where the plurality of LEDs are disposed around the PCB, and where the PCB is in a plane that has an angle with respect to a horizontal axis that is different than 0°.

Example 6. The downlight of one of examples 1 to 5, where the angle is between 5° and 15°.

Example 7. The downlight of one of examples 1 to 6, where the field-of-view of the millimeter-wave radar determines a plane, and where the controller is configured to count a number of humans crossing the plane and to transmit the count to the wireless server using the wireless module as part of the log data.

Example 8. The downlight of one of examples 1 to 7, where the field-of-view of the millimeter-wave radar defines a plane, where the controller is configured to determine a first direction of movement of the detected human when the human crosses the plane from a first side to a second side, and determine a second direction of movement of the detected human when the human crosses the plane from the second side to the first side, and where the log data includes a direction of movement of the detected human.

Example 9. The downlight of one of examples 1 to 8, and where the controller is further configured to, during a time interval, determine a first count of humans crossing the plane from the first side of the plane to the second side of the plane, determine a second count of humans crossing the plane from the second side of the plane to the first side of the plane, and transmit the first and second counts to the wireless server using the wireless module as part of the log data.

Example 10. The downlight of one of examples 1 to 9, where the controller is configured to periodically determine the first and second counts and periodically transmit the first and second counts to the wireless server.

Example 11. The downlight of one of examples 1 to 10, where the controller is further configured to determine a range component of a location of the detected human, and where the controller is configured to determine the direction of movement of the detected human based on the range component.

Example 12. The downlight of one of examples 1 to 11, further including: a power converter configured to receive an AC supply voltage via a power connector; and a LED driver coupled to the plurality of LEDs, where the controller is configured to: receive data from the wireless module, and control the LED driver based on data received from the wireless module.

Example 13. The downlight of one of examples 1 to 12, where the controller is configured to adjust a luminosity of the plurality of LEDs by controlling the LED driver based on data received from the wireless module.

Example 14. The downlight of one of examples 1 to 13, where the LED driver is configured to determine a state of the AC supply voltage, and where the controller is configured to transmit the state of the AC supply voltage to the wireless server using the wireless module.

Example 15. The downlight of one of examples 1 to 14, where the wireless module is preconfigured such that the wireless module is configured to communicate with the wireless server when the power converter receives the AC supply voltage without user intervention.

Example 16. The downlight of one of examples 1 to 15, where the wireless module is configured to transmit data using a low-power wide-area network (LPWAN) protocol.

Example 17. The downlight of one of examples 1 to 16, where the log data includes the direction of movement of the human and a time stamp of the detected presence of the human.

Example 18. The downlight of one of examples 1 to 17, where the downlight is configured to be installed at a ceiling having a first height to a floor, where the controller is configured to calibrate the millimeter-wave radar to operate at the first height.

Example 19. The downlight of one of examples 1 to 18, where the controller is further configured to determine a frequency change between a signal transmitted from the millimeter-wave radar and a signal received by the millimeter-wave radar, and where the controller is configured to determine the direction of movement of the detected human based on the frequency change.

Example 20. The downlight of one of examples 1 to 19, where the millimeter-wave radar is a monostatic millimeter-wave radar.

Example 21. The downlight of one of examples 1 to 20, where the millimeter-wave radar is configured to determine a location of the detected human using elevation, azimuth, and range components.

Example 22. A method including: detecting a presence of a human in a field-of-view of a millimeter-wave radar embedded in a housing of a downlight; determining a direction of movement of the detected human; producing log data based on the direction of movement of the detected human; and transmitting the log data to a server using a wireless transmission channel.

Example 23. The method of example 22, further including: receiving log data from a plurality of downlights, the plurality of downlights including the downlight; determining a number of humans inside a building based on the log data from the plurality of downlights; and controlling a brightness of light produced by the plurality of downlights based on the determined number of humans inside the building.

Example 24. The method of one of examples 22 or 23, further including dimming the downlights when the determined number of humans inside the building is below a threshold.

Example 25. The method of one of examples 22 to 24, further including controlling an operation of an air conditioner of the building based on the determined number of humans inside the building.

Example 26. The method of one of examples 22 to 25, further including: receiving data from a pressure sensor located at a window or door of the building; and controlling a brightness of light produced by the downlight based on the data received from the pressure sensor.

Example 27. A method including: determining whether humans are entering or exiting a building using millimeter-wave radars embedded in respective housings of respective downlights of a plurality of downlights located at entrances of the building; calculating a first number of humans entering the building during a first period of time; calculating a second number of humans exiting the building during the first period of time; and controlling a brightness of light produced by the plurality of downlights based on the first and second number of humans.

Example 28. The method of example 27, further including: storing the first and second numbers in a database; and estimating a number of humans entering or exiting the building based on data from the database.

Example 29. The method of one of examples 27 or 28, further including: storing the first and second numbers in a database; and determining a peak time of human traffic based on data from the database.

Example 30. The method of one of examples 27 to 29, further including: accessing the database with an electronic device via the Internet; and displaying the peak time in the electronic device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. A downlight comprising:
a plurality of light emitting diodes (LEDs) disposed in a housing of the downlight; and
a millimeter-wave radar comprising:
an antenna disposed in the housing,
a controller configured to:
detect a presence of a human in a field-of-view of the millimeter-wave radar,
determine a direction of movement of the detected human, and
produce log data based on the direction of movement of the detected human, and
a wireless module configured to transmit the log data to a wireless server.

2. The downlight of claim 1, wherein the field-of-view of the millimeter-wave radar comprises a centerline that has an angle with respect to a vertical axis that is different than 0°.

3. The downlight of claim 2, wherein the antenna is disposed in a printed circuit board (PCB), wherein the plurality of LEDs are disposed around the PCB.

4. The downlight of claim 3, wherein the antenna is integrated in an integrated circuit that includes the millimeter-wave radar, and wherein the angle is between 5° and 15°.

5. The downlight of claim 1, wherein the field-of-view of the millimeter-wave radar determines a plane, and wherein the controller is configured to count a number of humans crossing the plane and to transmit the count to the wireless server using the wireless module as part of the log data.

6. The downlight of claim 1, wherein the field-of-view of the millimeter-wave radar defines a plane, wherein the controller is configured to determine a first direction of movement of the detected human in response to the human crossing the plane from a first side to a second side, and determine a second direction of movement of the detected human in response to the human crossing the plane from the second side to the first side, and wherein the log data comprises a direction of movement of the detected human.

7. The downlight of claim 6, and wherein the controller is further configured to, during a time interval, determine a first count of humans crossing the plane from the first side of the plane to the second side of the plane, determine a second count of humans crossing the plane from the second side of the plane to the first side of the plane, and transmit the first and second counts to the wireless server using the wireless module as part of the log data.

8. The downlight of claim 7, wherein the controller is configured to periodically determine the first and second counts and periodically transmit the first and second counts to the wireless server.

9. The downlight of claim 1, wherein the controller is further configured to determine a range component of a location of the detected human, and wherein the controller is configured to determine the direction of movement of the detected human based on the range component.

10. The downlight of claim 1, further comprising:
a power converter configured to receive an AC supply voltage via a power connector; and
a LED driver coupled to the plurality of LEDs, wherein the controller is configured to:
receive data from the wireless module, and
control the LED driver based on data received from the wireless module.

11. The downlight of claim 10, wherein the controller is configured to adjust a luminosity of the plurality of LEDs by controlling the LED driver based on data received from the wireless module.

12. The downlight of claim 10, wherein the LED driver is configured to determine a state of the AC supply voltage, and wherein the controller is configured to transmit the state of the AC supply voltage to the wireless server using the wireless module.

13. The downlight of claim 10, wherein the wireless module is preconfigured such that the wireless module is configured to communicate with the wireless server when the power converter receives the AC supply voltage without user intervention.

14. The downlight of claim 1, wherein the wireless module is configured to transmit data using a low-power wide-area network (LPWAN) protocol.

15. The downlight of claim 1, wherein the log data comprises the direction of movement of the human and a time stamp of the detected presence of the human.

16. The downlight of claim 1, wherein the downlight is configured to be installed at a ceiling having a first height to a floor, wherein the controller is configured to calibrate the millimeter-wave radar to operate at the first height.

17. The downlight of claim 1, wherein the controller is further configured to determine a frequency change between a signal transmitted from the millimeter-wave radar and a signal received by the millimeter-wave radar, and wherein the controller is configured to determine the direction of movement of the detected human based on the frequency change.

18. A system comprising:
a wireless server; and
a plurality of downlights, each downlight comprising:
a housing,
a plurality of light emitting diodes (LEDs) disposed in the housing, and
a millimeter-wave radar comprising:
an antenna disposed in the housing,
a controller configured to:
detect a presence of a human in a field-of-view of the millimeter-wave radar,
determine a direction of movement of the detected human, and
produce log data based on the direction of movement of the detected human, and
a wireless module configured to transmit the log data to the wireless server.

19. The system of claim 18, wherein the server is configured to determine whether humans are entering or exiting a building based on the log data received by the wireless server from the plurality of downlights.

20. The system of claim 18, wherein the server is configured to control a brightness of light produced by the plurality of LEDs of one or more downlights of the plurality of downlights based on the log data received by the wireless server from the plurality of downlights.

21. The system of claim 18, wherein the server is configured to estimate a number of humans entering or exiting a building based on the log data received by the wireless server from the plurality of downlights.

22. The system of claim 18, wherein the server is configured to determine a peak time of human traffic based on the log data received by the wireless server from the plurality of downlights.

23. The system of claim 18, wherein the server is configured to determine a number of humans inside a building based on the log data received by the wireless server from the plurality of downlights.

24. The system of claim 23, wherein the server is configured to dim the plurality of downlights in response to the determined number of humans inside the building is below a threshold.

25. The system of claim 18, wherein the server is configured to control an operation of an air conditioner of a building based on the log data received by the wireless server from the plurality of downlights.

26. A downlight comprising:
a housing;
a plurality of light emitting diodes (LEDs) embedded in the housing;
a power converter configured to receive an AC supply voltage via a power connector;
a LED driver coupled to the plurality of LEDs; and
a millimeter-wave radar comprising:
an antenna disposed in the housing,
a controller configured to:
detect a presence of a human in a field-of-view of the millimeter-wave radar,
determine a direction of movement of the detected human, and
produce log data based on the direction of movement of the detected human, and
a wireless module configured to transmit the log data to a wireless server using a low-power wide-area network (LPWAN) protocol.

* * * * *